United States Patent
Chien et al.

(10) Patent No.: US 8,908,615 B2
(45) Date of Patent: Dec. 9, 2014

(54) BASE STATION, RELAY STATION, COMPUTING APPARATUS, AND REFERENCE SIGNAL TRANSMISSION, ALLOCATION, AND RECEIVING METHODS THEREOF

(75) Inventors: Chun-Che Chien, Taipei (TW); Tsung-Yu Tsai, Shanhua Town (TW); Yi-Ting Lin, Yonghe (TW)

(73) Assignee: Institute For Information Industry, Taipei (TW)

( * ) Notice: Subject to any disclaimer, the term of this patent is extended or adjusted under 35 U.S.C. 154(b) by 967 days.

(21) Appl. No.: 12/828,750

(22) Filed: Jul. 1, 2010

(65) Prior Publication Data
US 2011/0002256 A1  Jan. 6, 2011

Related U.S. Application Data

(60) Provisional application No. 61/222,479, filed on Jul. 1, 2009, provisional application No. 61/329,546, filed on Apr. 29, 2010.

(51) Int. Cl.
*H04W 74/00* (2009.01)
*H04L 5/00* (2006.01)
*H04B 7/26* (2006.01)

(52) U.S. Cl.
CPC ............ *H04L 5/0048* (2013.01); *H04L 5/0007* (2013.01); *H04B 7/2606* (2013.01); *H04B 7/2656* (2013.01)
USPC ............ 370/329; 370/437; 455/450; 455/509

(58) Field of Classification Search
None
See application file for complete search history.

(56) References Cited

U.S. PATENT DOCUMENTS

| | | | |
|---|---|---|---|
| 2006/0120395 A1* | 6/2006 | Xing et al. | 370/431 |
| 2006/0280262 A1* | 12/2006 | Malladi | 375/299 |
| 2007/0155431 A1* | 7/2007 | Munzner et al. | 455/560 |
| 2007/0258357 A1* | 11/2007 | Akita | 370/208 |
| 2008/0075178 A1* | 3/2008 | Lappetelainen et al. | 375/260 |
| 2008/0248805 A1* | 10/2008 | Han et al. | 455/450 |
| 2010/0046447 A1* | 2/2010 | Palanki et al. | 370/329 |
| 2010/0202393 A1* | 8/2010 | Zhang et al. | 370/329 |

(Continued)

FOREIGN PATENT DOCUMENTS

| | | |
|---|---|---|
| CN | 101052192 A | 10/2007 |
| WO | 2005125250 A1 | 12/2005 |

OTHER PUBLICATIONS

Office Action for Chinese counterpart application to the present US application by China State Intellectual Property Office (SIPO), Jan. 15, 2014, 10 pages (including English summary).

*Primary Examiner* — Duc Duong
(74) *Attorney, Agent, or Firm* — Skaar Ulbrich Macari, P.A.

(57) ABSTRACT

A base station, relay station, computing apparatus, and reference signal transmission, allocation, and receiving methods thereof are provided. For each the antennas, the BS perform the following operations: (i) generating a BS superframe comprising a first kind frame and a second kind frame, each of the first and second kind frames comprising a plurality of subframes and defining a downlink access zone and a downlink relay zone, (ii) allocating allocates a reference signal of the antenna in a first OFDM symbol in only one of the subframes in the first kind frame, the first OFDM symbol belonging to the downlink access zone of the first kind frame, and (iii) allocating the reference signal in a second OFDM symbol in only one of the subframes, the second OFDM symbol belonging to the downlink access zone or the downlink relay zone.

18 Claims, 26 Drawing Sheets

(56) References Cited

U.S. PATENT DOCUMENTS

| | | | |
|---|---|---|---|
| 2011/0034192 A1* | 2/2011 | Lim et al. | 455/501 |
| 2011/0310725 A1* | 12/2011 | Ma et al. | 370/210 |
| 2012/0120925 A1* | 5/2012 | Kadous et al. | 370/336 |
| 2012/0202553 A1* | 8/2012 | Han et al. | 455/522 |

\* cited by examiner

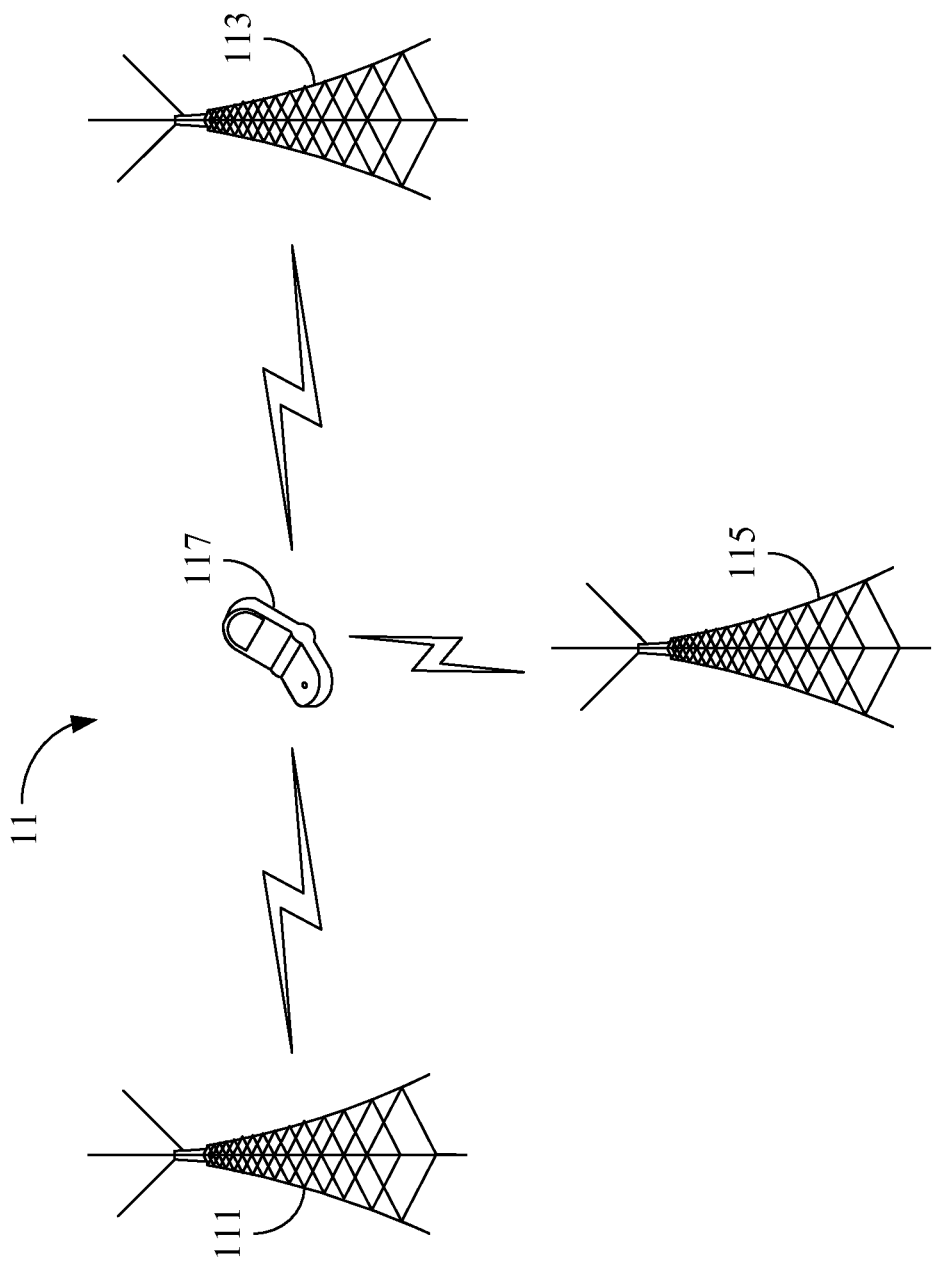

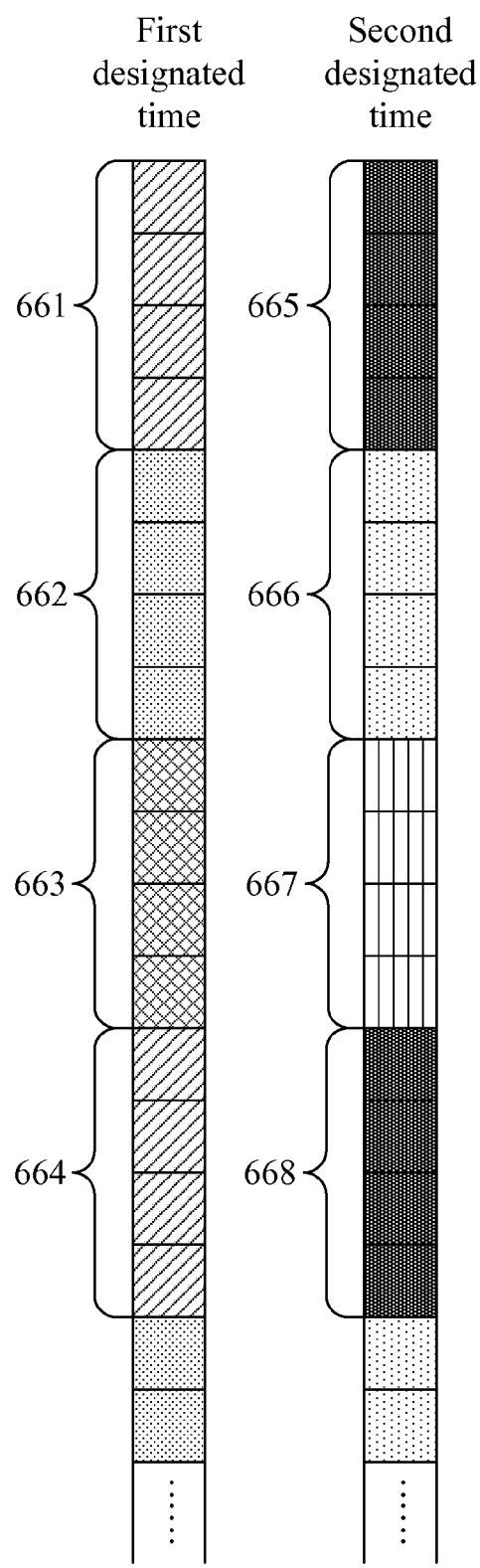
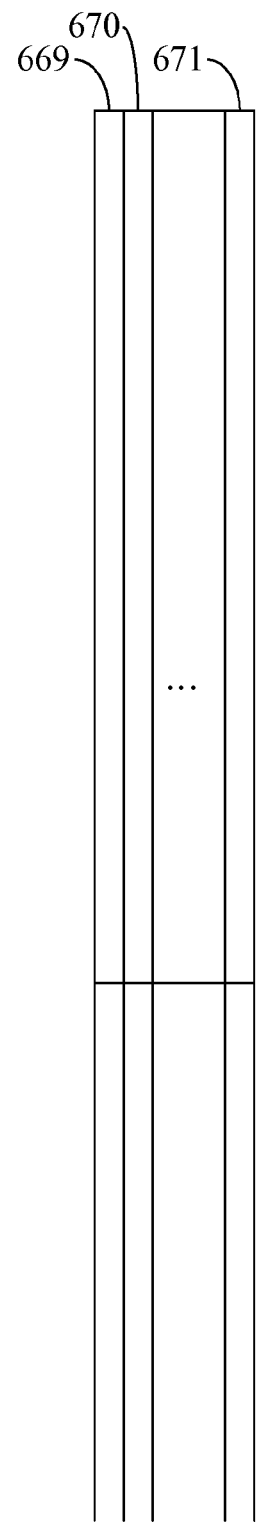
FIG. 6F
FIG. 6G

US 8,908,615 B2

BASE STATION, RELAY STATION, COMPUTING APPARATUS, AND REFERENCE SIGNAL TRANSMISSION, ALLOCATION, AND RECEIVING METHODS THEREOF

PRIORITY

This application claims the benefit of U.S. Provisional Application Ser. No. 61/222,479, filed on Jul. 1, 2009, and U.S. Provisional Application Ser. No. 61/329,546, filed on Apr. 29, 2010, each of which are hereby incorporated by reference herein.

FIELD

The present invention relates to a base station, relay station, computing apparatus, and reference signal transmission, allocation, and receiving methods thereof. More particularly, the base station, relay station, computing apparatus, and reference signal transmission, allocation, and receiving methods thereof allocates and transmits less reference signal in a frame.

BACKGROUND

Wireless communication technologies are widely used in nowadays. FIG. 1A illustrates the schematic view of a conventional multi-cell wireless communication system 11 adopting Multi-Input and Multi-Output (MIMO) technology. The multi-cell wireless communication system 11 comprises three base stations (BSs) 111, 113, 115 and a mobile station (MS) 117, wherein the BS 115 is the serving BS of the MS 117. Since the BSs 111, 113 are in the neighborhoods of the BS 115 and the MS 117, they will interfere in signal transmissions between the BS 115 because MS 117.

FIG. 1B illustrates another conventional multi-cell wireless communication system 13 adopting MIMO technology, wherein the multi-cell wireless communication system 13 comprises one BS 131, one relay station (RS) 133, and two MSs 135, 137. The MS 135 receives signals from BS 131 directly, while the MS 137 receives signals from the BS 131 through the RS 133. Since the MSs 135, 137 are near the edges of the coverages of the BS 131 and the RS 133, signals transmitted from the RS 133 will interfere in signal transmission between the BS 131 and the MS 135. Likewise, signals transmitted from the BS 131 will interfere in signal transmission RS 133 and the MS 137.

FIG. 1C illustrates yet another conventional multi-cell wireless communication system 15 adopting MIMO technology, wherein the multi-cell wireless communication system 15 comprises three BSs 151, 152, 153, three RSs 154, 155, 156, and two MSs 157, 159. The MS 157 receives signals from the BS 152 directly, while the MS 159 receives signals from RS 155. Since the MSs 157, 159 are near the edges of the coverages of the BS 152 and the RS 155, signals transmitted to the MSs 157, 159 will be interfered in by other BSs and/or RSs.

Since the multi-cell wireless communication systems 11, 13, 15 adopt MIMO technologies, each of the BSs 111, 113, 115, 131, 151, 152, 153 and RSs 133, 154, 155, 156 comprises a plurality of antennas. In MIMO, a signal has to be processed by a precoder before being transmitted by a BS or an RS. To choose a suitable precoder, an MS and an RS has to estimate a channel status for each of the antennas of the serving BS and the neighboring BS and transmit the channel status to the serving BS. The BSs under cooperation will decide the suitable precoder for each of their MSs and RSs, wherein the suitable precoder usually makes the serving BS have the greatest gain and the neighboring BS have less interference to the MS/RS.

In MIMO, a BS allocates reference signals in a predetermined position of a superframe. After receiving the superframe, an MS and an RS can retrieve the reference signals and estimate the channel status accordingly. FIG. 1D illustrates a superframe structure 17 of the IEEE 802.16m standard. When a superframe conforming to the superframe structure 17 is generated by a BS, a frame 171 of the superframe defines a downlink access zone and a downlink relay zone and comprises eight subframes 171a, 171b, 171c, 171d, 171e, 171f, 171g, 171h. Specifically, the downlink access zone comprises subframes 171a, 171b, 171c, 171d, while the downlink relay zone comprise subframes 171e, 171f, 171g, 171h. The second subframe 171b in the downlink access zone is used to allocate a midamble (i.e. the aforementioned reference signal) 170 so that an MS in the coverage of the BS can read the midamble 170 to estimate the channel status. The third subframe 171g in the downlink relay zone is used to allocate another midamble (i.e. the aforementioned reference signal) 172 so that an RS in the coverage of the BS can read the midamble 172 to estimate the channel status. Since an RS is generally fixed relative to a BS, the channel variation is not as fast as an MS, therefore, the appearance frequency of reference signal for an RS needs not to be as often as the one for an MS.

When a superframe conforming to the superframe structure 17 is generated by an RS, a frame 173 of the superframe defines a downlink access zone and a downlink relay zone and comprises eight subframes 173a, 173b, 173c, 173d, 173e, 173f, 173g, 173h. Specifically, the downlink access zone comprises subframes 173a, 173b, 173c, 173d, while the downlink relay zone comprise subframes 173e, 173f, 173g, 1731h. The second subframe 173b in the downlink access zone is used to allocate a midamble (i.e. the aforementioned reference signal) 174 so that an MS in the coverage of the RS can read the midamble 174 to estimate the channel status.

Although there are technologies for transmitting reference signals, current technologies do not support a multi-cell wireless communication system that comprise more than one BSs and more than one RSs. Consequently, there is a need in providing a mechanism that supports a multi-cell wireless communication system that comprises more than one BSs and more than one RSs. In addition, since current technologies reference signals occupies radio resources, there is a need to reduce the reference signals as well.

SUMMARY

An objective of certain embodiments of the present invention is to provide a base station (BS). The BS comprises a plurality of antennas, a backhaul interface, and a processing unit. The backhaul interface is configured to receive a signal from a computing apparatus, wherein the signal indicates that each of the antennas is able to use a plurality of predetermined subcarriers. The processing unit is configured to perform the following operations for each of the antennas: (i) generating a first BS superframe comprising a first kind frame and a second kind frame, each of the first and second kind frames comprising a plurality of subframes, each of the first and second kind frames defining a downlink access zone and a downlink relay zone, (ii) allocating a reference signal of the antenna in a first Orthogonal Frequency-Division Multiplexing (OFDM) symbol in only one of the subframes in the first kind frame, the first OFDM symbol belonging to the downlink access zone of the first kind frame, (iii) allocating the reference signal in a second OFDM symbol in only one of the subframes of in the second kind frame, the second OFDM symbol belonging to the downlink relay zone, and (iv) recording a piece of information in the first BS superframe, the piece of information being related to a location of the reference signal in each of the first and second kind frames. Each of the antennas is configured to transmit the corresponding first BS superframe by the corresponding predetermined subcarriers.

Another objective of certain embodiments of the invention is to provide a relay station (RS). A wireless communication system comprises a BS, the RS, and a computing apparatus, wherein the BS serves the RS. The RS comprises a plurality of antennas and a processing unit. Each of the antennas corresponds to a reference signal. Each of the antennas is configured to receive a signal from a computing apparatus through the BS, wherein the signal indicates that each of the antennas is able to use a plurality of predetermined subcarriers. The a processing unit is configured to perform the following operations for each of the antennas: (i) generating a first RS superframe comprising a first kind frame and a second kind frame, each of the first and second kind frames comprising a plurality of subframes, each of the first and second kind frames defining a downlink access zone and a downlink relay zone, (ii) allocating a reference signal of the antenna in an OFDM symbol in only one of the subframes in the first kind frame, the first OFDM symbol belonging to the downlink access zone of the first kind frame, and (iii) recording a piece of information in the first RS superframe, the piece of information being related to a location of the reference signal in the first kind frame. Each of the antennas is configured to transmit the corresponding first RS superframe by the corresponding predetermined subcarriers.

Yet another objective of certain embodiments of the present invention is to provide a computing apparatus. The computing apparatus comprises a backhaul interface and a processing unit. The backhaul interface is connected to a plurality of BSs, wherein each of the BSs has a plurality of antennas, a wireless communication system comprising the BSs. The processing unit is configured to determine a number of subcarriers of the wireless communication system and assign a usable set of the subcarriers to each of the antennas. The backhaul interface transmits a signal indicating the usable set of subcarriers to each antenna of each of the BSs. The wireless communication system may further comprise a plurality of RSs, wherein each of the RSs also comprises a plurality of antennas. When the wireless communication system comprises the BSs and RSs, the processing unit assigns a usable set of the subcarriers to each of the antennas of the BSs and RSs. The backhaul interface transmits signals indicating the usable set of subcarriers of each of the BSs and RSs to the BSs. The RSs then receive the signals indicating the usable set of subcarriers from the corresponding BS.

A further objective of certain embodiments of the present invention is to provide a reference signal transmission method, which is adapted to a BS. The BS comprises a plurality of antennas, a backhaul interface, and a processing unit. The reference signal transmission method comprises the following steps of: (a) enabling the backhaul interface to receive a signal from a computing apparatus, the signal indicating that each of the antennas is able to use a plurality of predetermined subcarriers; (b) enabling the processing unit to perform the following operations for each of the antennas: (b1) generating a first BS superframe comprising a first kind frame and a second kind frame, each of the first and second kind frames comprising a plurality of subframes, each of the first and second kind frames defining a downlink access zone and a downlink relay zone; (b2) allocating a reference signal of the antenna in a first OFDM symbol in only one of the subframes in the first kind frame; (b3) allocating the reference signal in a second OFDM symbol in only one of the subframes of in the second kind frame, the second OFDM symbol belonging to the downlink relay zone; and (b4) recording a piece of information in the first BS superframe, the piece of information being related to a location of the reference signal in each of the first and second kind frames; and (c) enabling each of the antennas to transmit the corresponding first BS superframe by the corresponding predetermined subcarriers.

Yet a further objective of certain embodiments of the present invention is to provide a reference signal transmission method, which is adapted to an RS. A wireless communication system comprises a BS, the RS, and a computing apparatus, wherein the BS serves the RS. The RS comprises a plurality of antennas and a processing unit. The reference signal transmission method comprises the following steps of: (a) enabling each of the antennas to be informed from a computing apparatus through the BS, the signal indicating that each of the antennas being able to use a plurality of predetermined subcarriers; and (b) enabling the processing unit to perform the following operations for each of the antennas: (b1) generating a first RS superframe comprising a first kind frame and a second kind frame, each of the first and second kind frames comprising a plurality of subframes, each of the first and second kind frames defining a downlink access zone and a downlink relay zone; (b2) allocating a reference signal of the antenna in an OFDM symbol in only one of the subframes in the first kind frame, the first OFDM symbol belonging to the downlink access zone of the first kind frame; and (b3) recording a piece of information in the first RS superframe, the piece of information being related to a location of the reference signal in the first kind frame; and enabling each of the antennas to transmit the corresponding first RS superframe by the corresponding predetermined subcarriers.

Yet a further objective of certain embodiments of the present invention is to provide a reference signal allocation method, which is adapted to a computing apparatus. The computing apparatus comprises a backhaul interface and a processing unit. The backhaul interface is connected to a plurality of BSs, and each of the BSs has a plurality of antennas. A wireless communication system comprises the BSs. The reference signal allocation method comprises the following steps of: (a) enabling the processing unit to determine a number of subcarriers of the wireless communication system; (b) enabling the processing unit to assign a usable set of the subcarriers to each of the antennas; and (c) enabling the backhaul interface to transmit a signal indicating the usable set of subcarriers regarding to each antenna of each of the BSs. The wireless communication system may further comprise a plurality of RSs, wherein each of the RSs also comprises a plurality of antennas. When the wireless communication system comprises the BSs and RSs, the above step (b) assigns a usable set of the subcarriers to each of the antennas of the BSs and RSs and the above step (c) transmits signals indicating the usable set of subcarriers of each of the BSs and RSs to the BSs. Then, RSs can receive the signals indicating the usable set of subcarriers from the corresponding BS.

Yet a further objective of certain embodiments of the present invention is to provide a reference signal receiving method, which is adapted to a mobile station (MS). A wireless communication system comprises a BS and the MS. The BS serves the MS. The MS comprises a processing unit and a transceiver. The reference signal receiving method comprises the following steps of: (a) enabling the transceiver to receive a BS superframe from the BS, the BS superframe comprising a frame, the frame comprising a plurality of subframes and defining a downlink access zone and a downlink relay zone, an OFDM symbol in one subframe of the frame being allocated with a reference signal, the OFDM symbol belonging to the downlink relay zone; (b) enabling the transceiver to read the reference signal allocated in the OFDM symbol; and (c) enabling the processing unit to estimate a channel status between the BS and the MS according to the reference signal.

Yet a further objective of certain embodiments of the present invention is to provide a reference signal receiving method, which adapted to an MS. A wireless communication system comprises an RS and the MS. The RS serves the MS. The MS comprises a processing unit and a transceiver. The reference signal receiving method comprises the following steps of: (a) enabling the transceiver to receive an RS superframe from the RS, the RS superframe comprising a first kind frame and a second kind frame, the first kind frame defining a downlink access zone and a downlink relay zone, the second kind frame defining a downlink access zone and a downlink relay zone, a first duration of the downlink access zone of the first kind frame being unequal to a second duration of the downlink access zone of the second kind frame; (b) enabling the processing unit to adjust an accessing time to be equal to the first duration; (c) enabling the transceiver to access the downlink access zone of the first kind frame for the accessing time; (d) enabling the processing unit to adjust the accessing time to be equal to the second duration; and (e) enabling the transceiver to access the downlink access zone of the second kind frame for the accessing time. Since the duration of the downlink access zone is adjustable, when the MS shorten the duration of the downlink access zone, the RS can switch to a reading mode to access a downlink relay zone in a frame of a BS superframe.

The present invention is related to frame structures, BSs using the frame structures, RSs using the frame structures, reference signal transmission method, and reference signal allocation method that are used in multi-cell wireless communication systems. By having the frame structures along with the reference signal transmission method and reference signal allocation method, reference signals occupies less radio resources than the prior technologies.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 1A illustrates a conventional multi-cell wireless communication system;

FIGS. 6A, 6B, 6C, 6D, 6E, 6F, and 6G respectively illustrate the assignment of the subcarriers in the seventh, eighth, ninth, tenth, eleventh, twelfth, and thirteenth example embodiments;

DETAILED DESCRIPTION

In the following descriptions, the present invention will be explained with reference to various example embodiments; nevertheless, these example embodiments are not intended to limit the present invention to any specific environment, example, embodiment, applications, or particular implementations described in these example embodiments. Therefore, descriptions of these example embodiments are only provided for purpose of illustration but not to limit the present invention. It should be appreciated that elements unrelated directly to the present invention are omitted from the embodiments and the attached drawings.

Figure 1B:
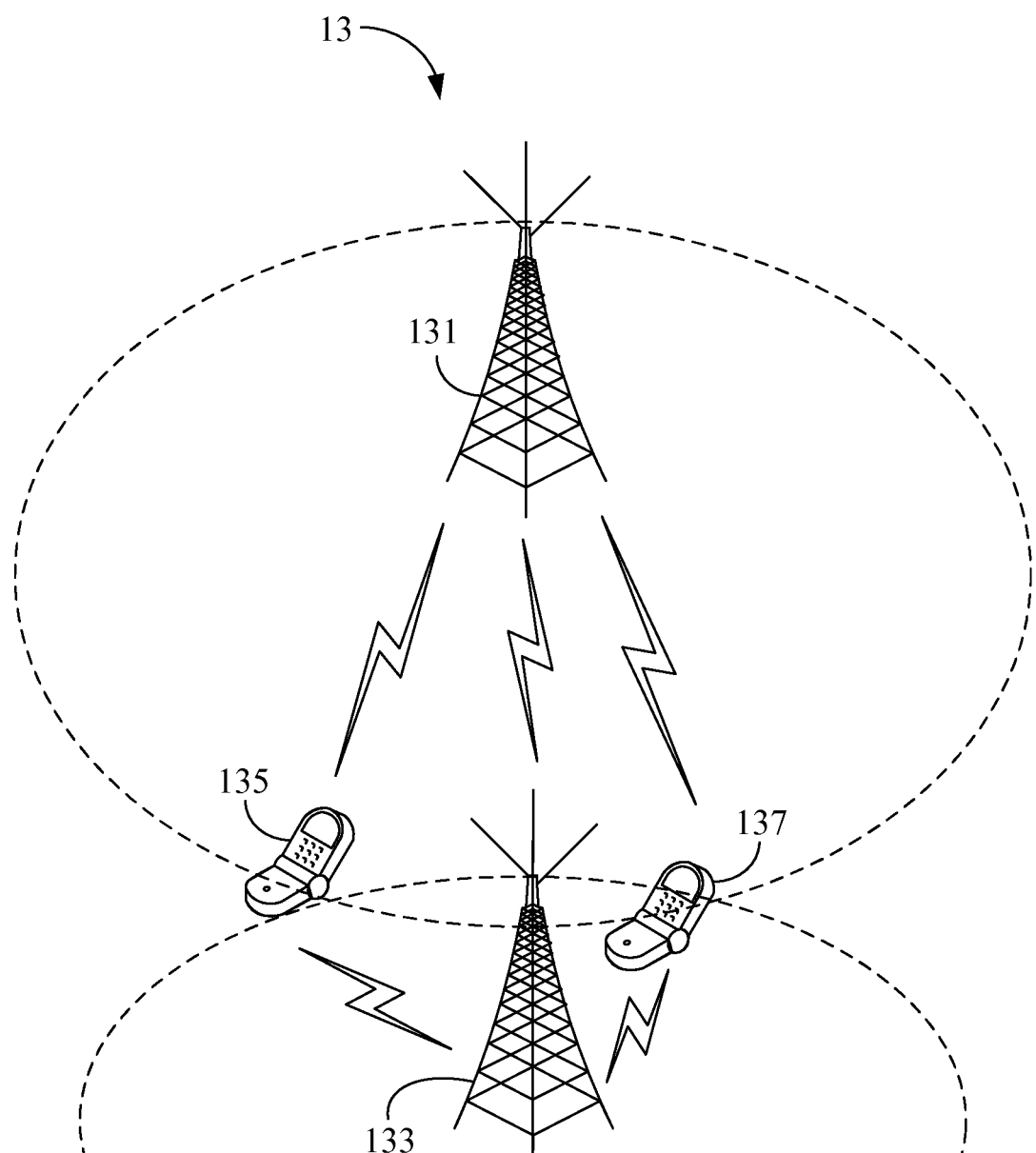
FIG. 1B illustrates another conventional multi-cell wireless communication system.
Figure 1C:
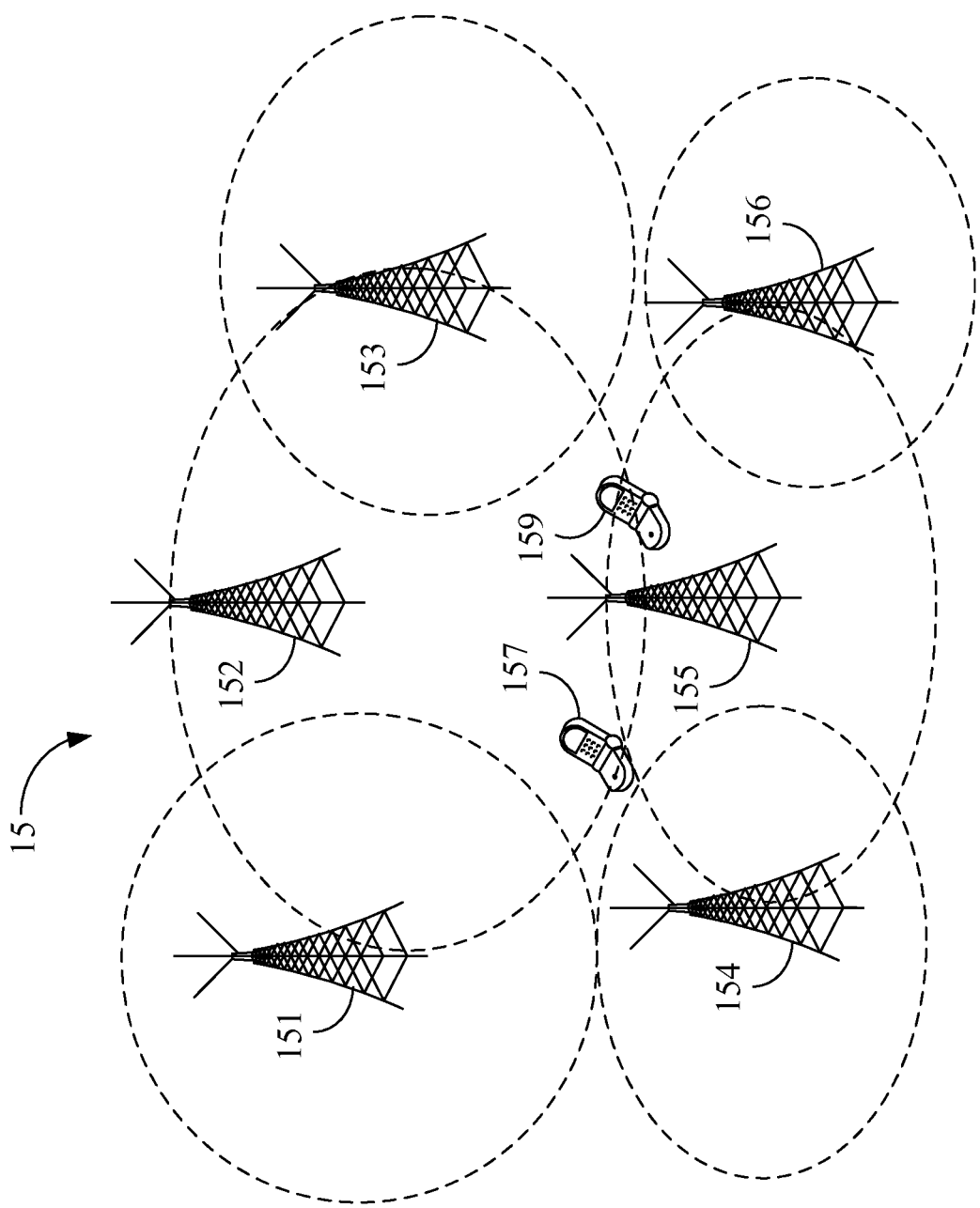
FIG. 1C illustrates yet another conventional multi-cell wireless communication system.
Figure 1D:
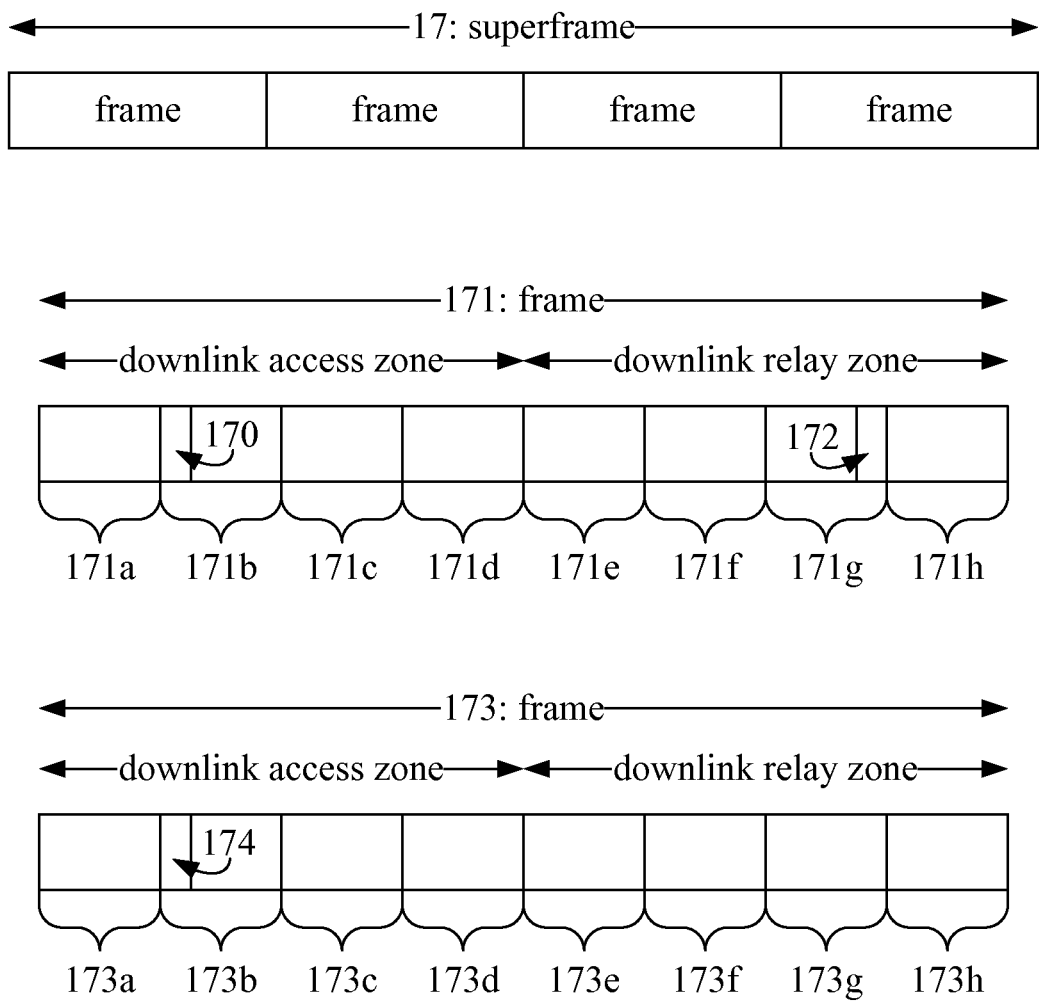
FIG. 1D illustrates a superframe structure of the IEEE 802.16m standard.
Figure 2A:
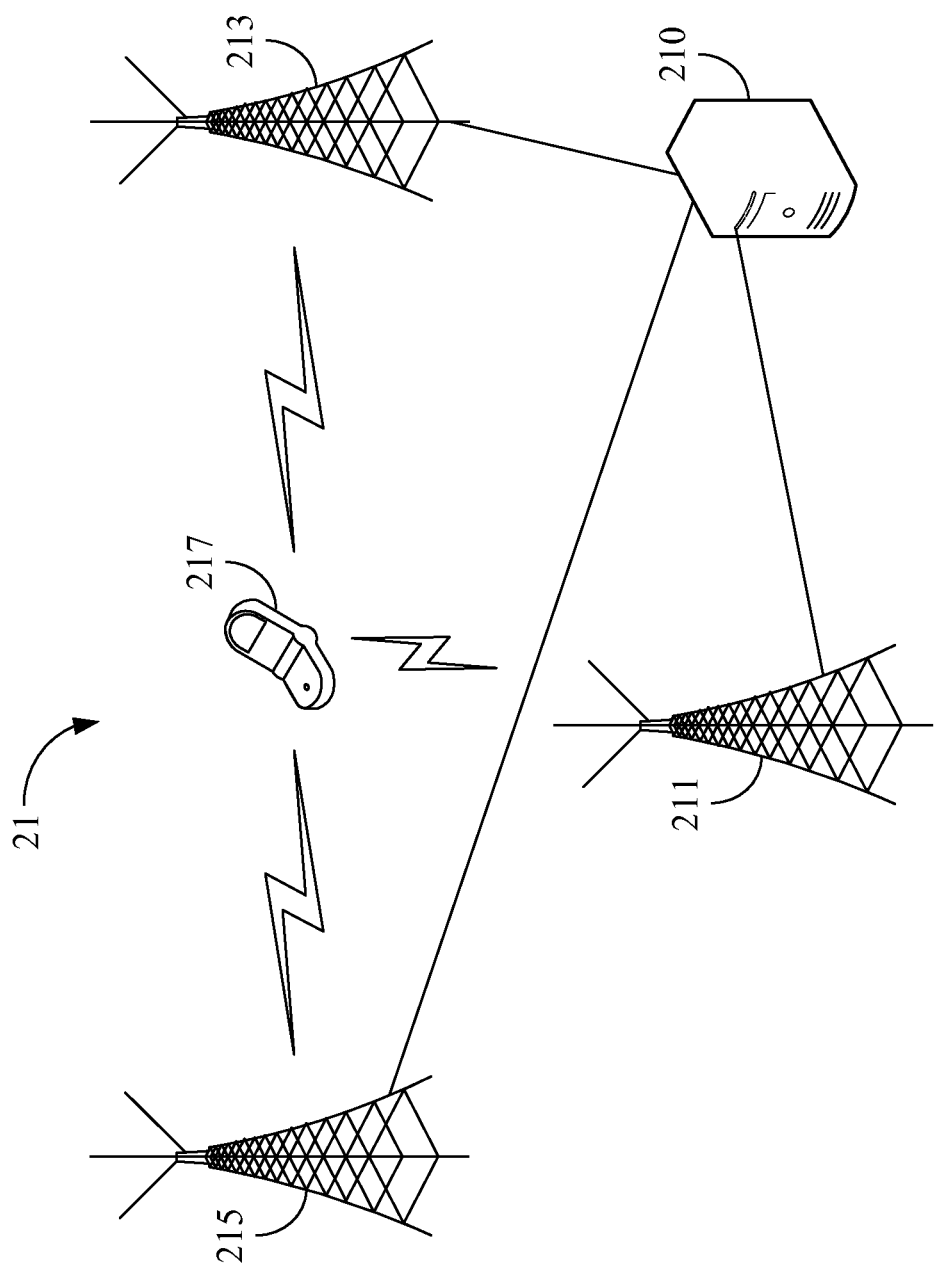
FIG. 2A illustrates a multi-BS wireless communication system according to an example embodiment of the present invention.
Figure 2B:
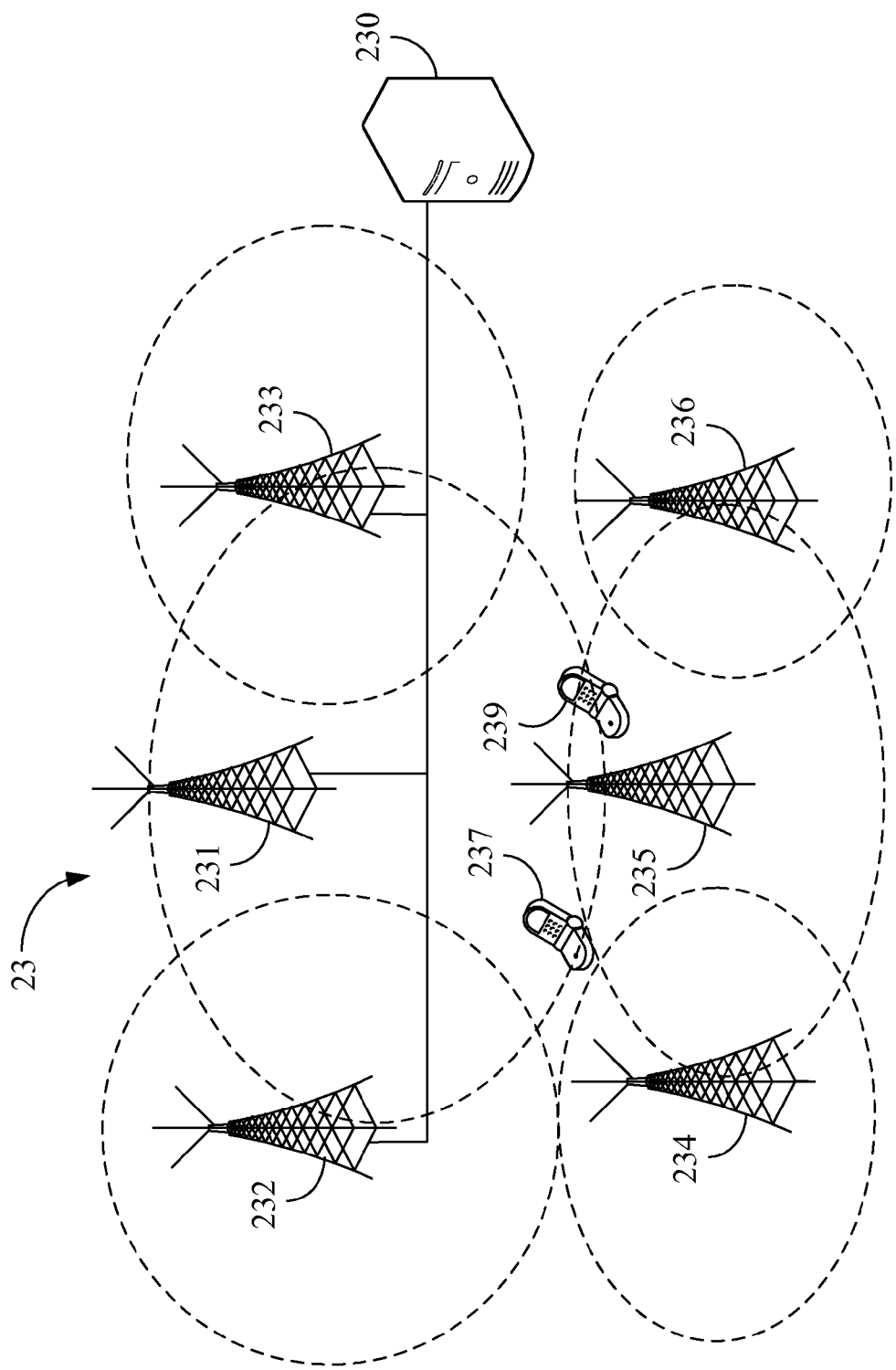
FIG. 2B illustrates a multi-BS and multi-RS wireless communication system according to an example embodiment of the present invention.
Figure 2C:
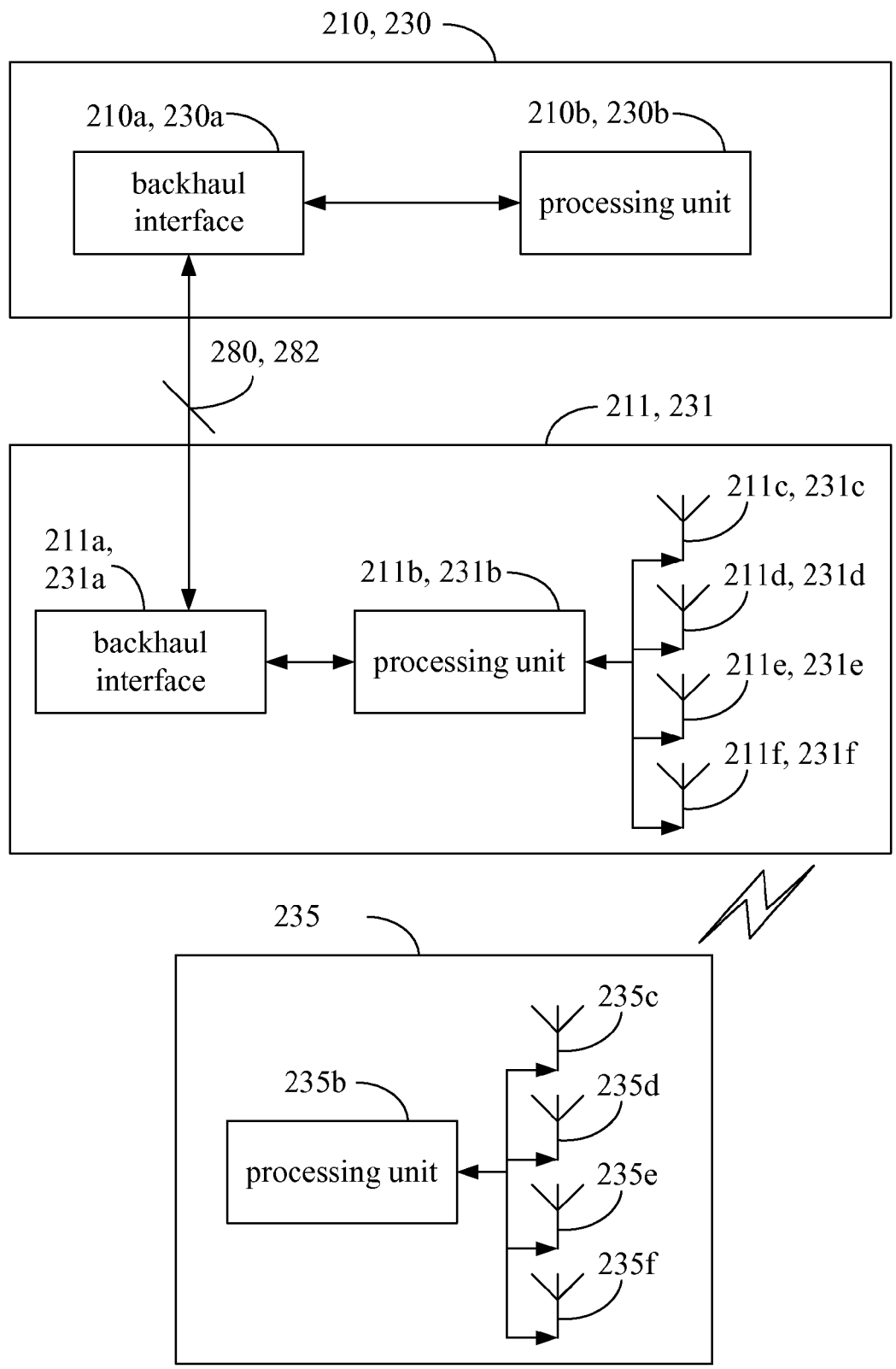
FIG. 2C illustrates a block diagram of the computing apparatuses, BSs, and RSs of the present invention.

The present invention is related to frame structures, base stations (BSs) using the frame structures, relay stations (RSs) using the frame structures, reference signal transmission method, and reference signal allocation method that are used in multi-cell wireless communication systems. There are several types of multi-cell wireless communication systems. FIGS. 2A and 2B illustrate two examples of them, which will be used to describe the idea of the present invention. FIG. 2A illustrates a schematic view of a multi-BS wireless communication system 21 adopting Multi-Input and Multi-Output (MIMO) technology. The multi-BS wireless communication system 21 comprises three BSs 211, 213, 215, a mobile station (MS) 217, and a computing apparatus 210, wherein the BS 211 is the serving BS of the MS 217. All the three BSs 211, 213, 215 are connected to the computing apparatus 210, which may be a server. Since the BSs 211, 213, 215 operate similarly in view of the present invention, only the BS 211 is described when referring to the BS in the multi-BS wireless communication system 21. As shown in FIG. 2C, the BS 211 comprises a backhaul interface 211a, a processing unit 211b, and four antennas 211c, 211d, 211e, 211f, while the computing apparatus 210 comprises a backhaul interface 210a and a processing unit 210b. It is noted that each of the BSs 113, 115 comprises a backhaul interface, a processing unit, and a plurality of antennas as well.

FIG. 2B illustrates a multi-BS and multi-RS wireless communication system 23 adopting MIMO technology. The multi-cell wireless communication system 23 comprises three BSs 231, 232, 233, three RSs 234, 235, 236, two MSs 237, 239, and a computing apparatus 230. The BS 231 is the serving BS of the MS 237. The MS 239 receives signals from the RS 235. The BSs 231, 232, 233 are connected to the computing apparatus 230. Since the BSs 231, 232, 233 operate similarly in view of the present invention, only the BS 231 is described when referring to the BS in the multi-BS and multi-RS wireless communication system 23. Likewise, since the RSs 234, 235, 236 operate similarly in view of the present invention, only the RS 235 is described when referring to the RS in the multi-BS and multi-RS wireless communication system 23. As shown in FIG. 2C, the BS 231 comprises a backhaul interface 231a, a processing unit 231b, and four antennas 231c, 231d, 231e, 231f, the RS 235 comprises a processing unit 235b and four antennas 235c, 235d, 235e, 235f, and the computing apparatus 230 comprises a backhaul interface 230a and a processing unit 230b. It is noted that each of the BSs 232, 233 comprises a backhaul interface, a processing unit, and a plurality of antennas as well and each of the RS 234, 236 comprises a processing unit and a plurality of antennas as well.

Figure 3A:
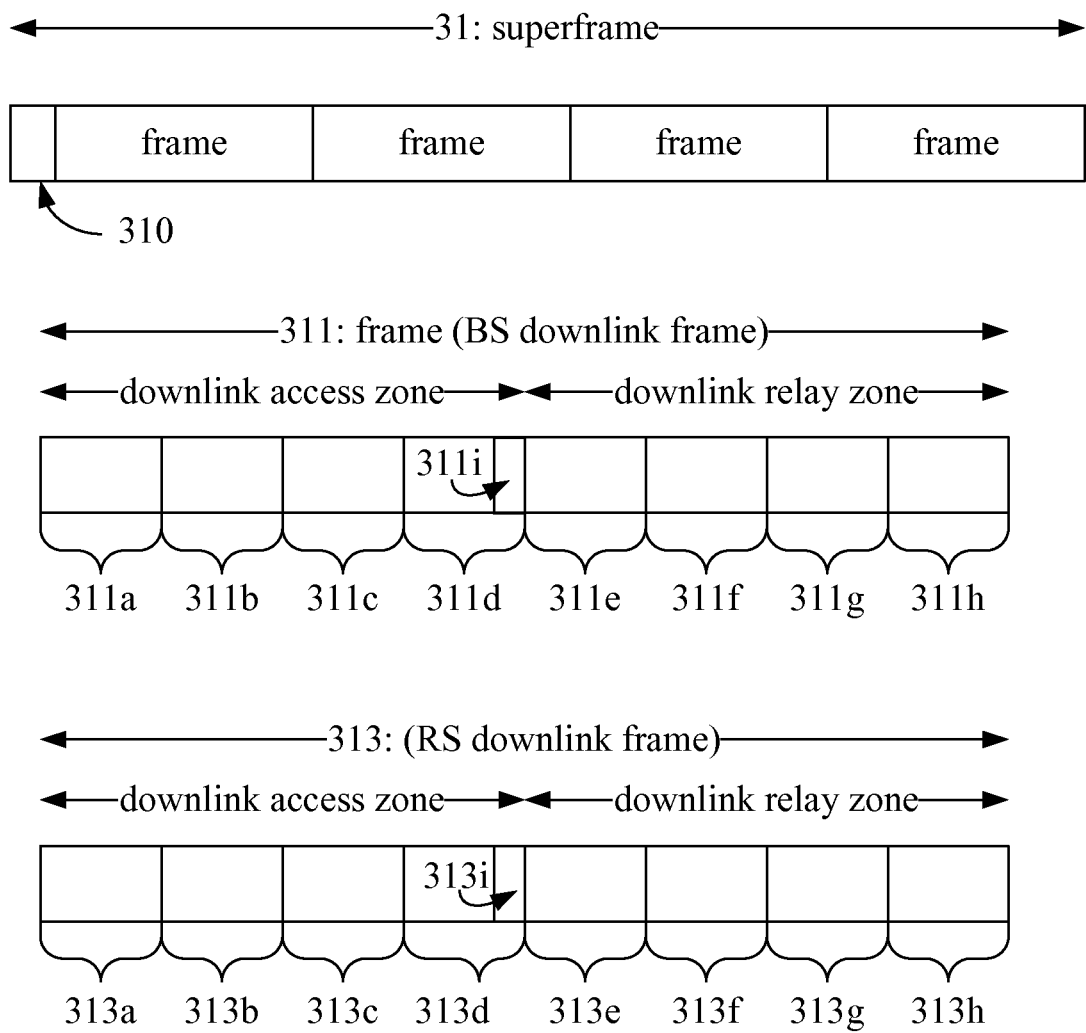
FIG. 3A illustrates a superframe structure used in the first and second example embodiments.

FIG. 3A illustrates a superframe structure 31 of the present invention, which will be used in the first and second embodiments of the present invention. The superframe structure 31 may conform to the IEEE 802.16m standard or the Long Term Evolution (LTE) standard. The superframe structure 31 comprises a superframe header 310 and a plurality of frames.

When a BS generates a BS superframe conforming to the superframe structure 31, a frame 311 comprised in the BS superframe is a frame for BS downlink (called a BS downlink frame). The frame 311 of the BS superframe defines a downlink access zone and a downlink relay zone and comprises a plurality of subframes, such as eight subframes 311a, 311b, 311c, 311d, 311e, 311f, 311g, 311h. Specifically, the downlink access zone comprises subframes 311a, 311b, 311c, 311d, while the downlink relay zone comprise subframes 311e, 311f, 311g, 311h. One subframe in the frame 311 is used to be allocated with a reference signal and the subframe being allocated with a reference signal may belong to the downlink access zone or downlink relay zone. If the subframe that is allocated with a reference signal belongs to the downlink access zone, the reference signal can be read by an MS in the coverage of the BS. If the subframe that is allocated with a reference signal belongs to the downlink relay zone, the reference signal can be read by an MS and an RS in the coverage of the BS. For example, the last subframe 311d in the downlink access zone is used to be allocated a reference signal 311i, such as a midamble in the IEEE 802.16m standard or a Channel State Information (CSI) reference signal in the LTE standard. By doing so, an MS in the coverage of the BS can read the reference signal 311i to estimate the channel status.

When an RS generate an RS superframe conforming to the superframe structure 31, a frame 313 of the RS superframe comprised in the RS superframe 31 is a frame for RS downlink. The frame 313 defines a downlink access zone and a downlink relay zone and comprises eight subframes 313a, 313b, 313c, 313d, 313e, 313f, 313g, 313h. One subframe is used to be allocated with a reference signal and the subframe being allocated with a reference signal belongs to the downlink access zone. For example, the last subframe 313d in the downlink relay access zone is used to be allocated with a reference signal 313i so that an MS in the coverage of the RS can read the reference signal 313i to estimate the channel status.

Figure 3B:
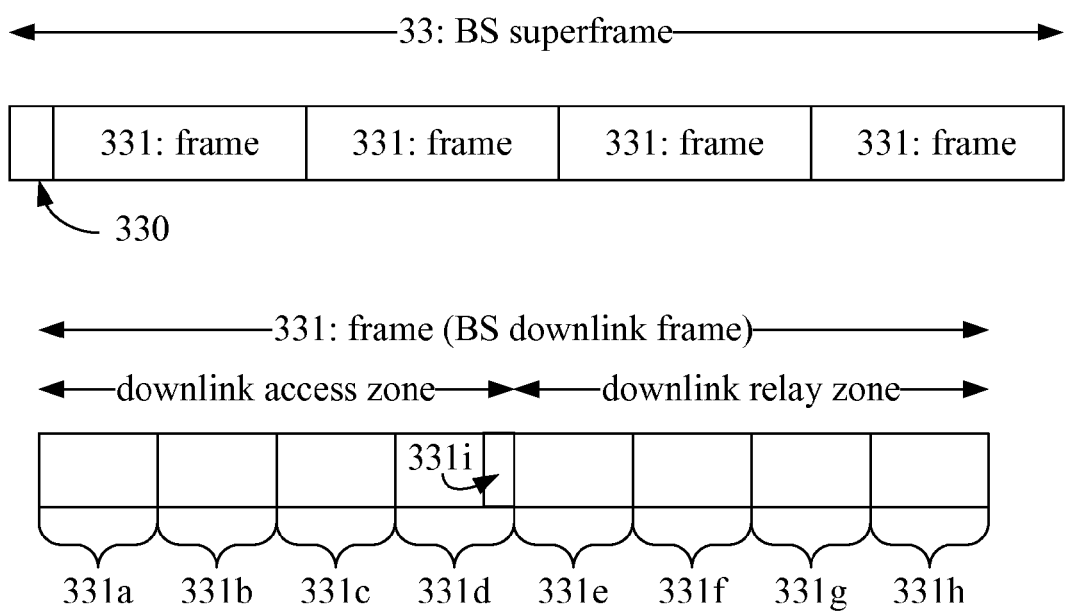
FIG. 3B illustrates a BS superframe in the first example embodiment.

A first embodiment of the present invention is the multi-BS wireless communication system 21 adopting the superframe structure 31. FIG. 3B illustrates a BS superframe 33 generated by the BS 211 in the multi-BS wireless communication system 21, and the details are elaborated in the following descriptions.

The backhaul interface 211a of the BS 211 receives a signal 280 from the computing apparatus 210. The signal 280 indicates that each of the antennas 211c, 211d, 211e, 211f are able to use a plurality of predetermined subcarriers of the multi-BS wireless communication system 21. Each of the antennas 211c, 211d, 211e, 211f corresponds to a reference signal for channel estimation.

For each of the antennas 211c, 211d, 211e, 211f, the processing unit 211b performs three main operations. First, the processing unit 211b generates a BS superframe 33 conforming to the superframe structure 31 for each of the antennas 211c, 211d, 211e, 211f. Each of the BS superframes 33 comprises a superframe header 330 and a plurality of frames 331. Each of the frames 331 is a BS downlink frame and comprises a plurality of subframes 331a, 331b, 331c, 331d, 331e, 331f, 331g, 331h. Each of the frames 331 defines a downlink access zone and a downlink relay zone, wherein the downlink access zone comprises the subframes 331a, 331b, 331c, 331d and the downlink relay zone comprise the subframes 331e, 331f, 331g, 331h.

Second, for each of the antennas 211c, 211d, 211e, 211f, the processing unit 211b allocates the reference signal 331i of that antenna in an OFDM symbol in only one of the subframes (i.e. the subframe 331d belonging to the downlink access zone) in each frame 331 of the corresponding BS superframe 33. Since the subframe 331d that is allocated with the reference signal 311i belongs to the downlink access zone, the reference signal 311i can be read by an MS (such as the MS 217) that is in the coverage of the BS 211.

Third, the processing unit 211b records a piece of information in each of the BS superframes 33, wherein the piece of information is related to a location of the reference signal in each frame 331. For example, the location may be a number indicating which subframe in the frame being allocated with a reference signal. The location may be recorded in the superframe header 330 of the BS superframe 33. Alternatively, the location may be recorded in a preamble of each of the frames 331. Thereafter, each of the antennas 211c, 211d, 211e, 211f transmits the corresponding BS superframes 33 by the corresponding predetermined subcarriers.

According to the above descriptions, it can be learned that a BS allocates a reference signal in only one subframe in a frame, so the radio resources of the wireless communication system can be saved.

Figure 3C:
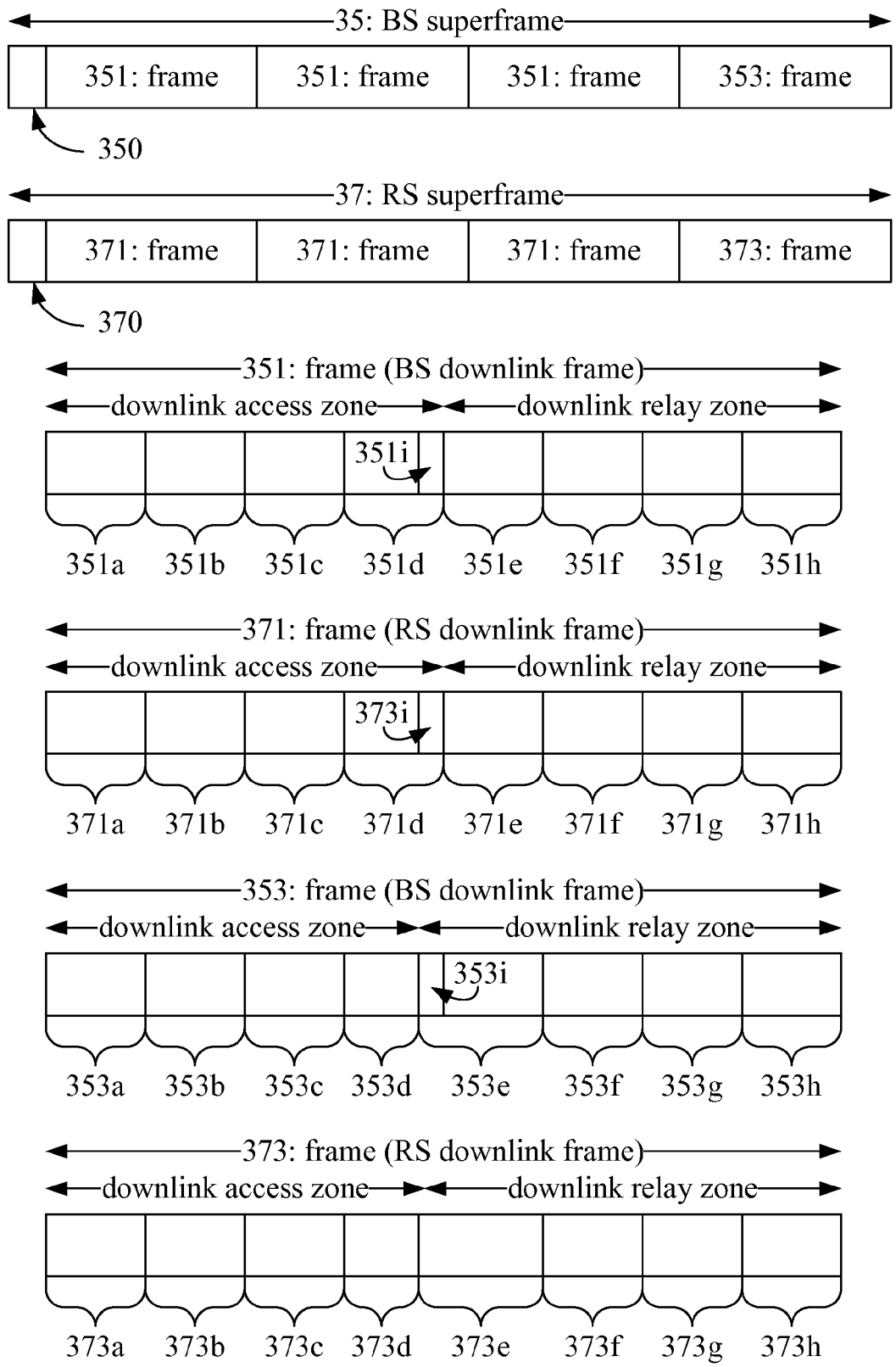
FIG. 3C illustrates a BS superframe and an RS superframe in the second example embodiment.

A second embodiment of the present invention is the multi-BS and multi-RS wireless communication system 23 adopting the superframe structure 31. FIG. 3C illustrates a BS superframe 35 generated by the BS 231 and an RS superframe 37 generated by the RS 235 in the multi-BS and multi-RS wireless communication system 23, and the details are elaborated in the following descriptions.

The backhaul interface 231a receives a signal 282 from the computing apparatus 230, wherein the signal 282 indicates that each of the antennas 231c, 231d, 231e, 231f are able to use a plurality of predetermined subcarriers of the multi-BS and multi-RS wireless communication system 23. Each of the antennas 231c, 231d, 231e, 231f corresponds to a reference signal for channel estimation.

For each of the antennas 231c, 231d, 231e, 231f, the processing unit 231b performs three main operations. First, the processing unit 231b generates a BS superframe 35 conforming to the superframe structure 31 for each of the antennas 231c, 231d, 231e, 231f, wherein the BS superframe 35 comprises a superframe header 350 and a plurality of frames 351, 353. Each of the frames 351 defines a downlink access zone and a downlink relay zone and comprises a plurality of subframes 351a, 351b, 351c, 351d, 351e, 351f, 351g, 351h. The downlink access zone of the frame 351 comprises the subframes 351a, 351b, 351c, 351d, while the downlink relay zone of the frame 351 comprise the subframes 351e, 351f, 351g, 351h. The frame 353 also defines a downlink access zone and a downlink relay zone and comprises a plurality of subframes 353a, 353b, 353c, 353d, 353e, 353f, 353g, 353h. The downlink access zone of the frame 353 comprises the subframes 353a, 353b, 353c, 353d, while the downlink relay zone of the frame 353 comprises the subframes 353e, 353f, 353g, 353h.

Second, for each of the antennas 231c, 231d, 231e, 231f, the processing unit 231b allocates the reference signal 351i of that antenna in an OFDM symbol in only one of the subframes (i.e. the subframe 351d) in the down link access zone of each frame 351. Since the subframe 351d that is allocated with the reference signal 351i belongs to the downlink access zone, the reference signal 351i can be read by an MS (such as the MS 237) that is in the coverage of the BS 231. In addition, for each of the antennas 231c, 231d, 231e, 231f, the processing unit 231b allocates the reference signal 353i of that antenna in an OFDM symbol in only one of the subframes (i.e. the subframe 353e) in the down link relay zone of each frame 353. It is emphasized that the downlink access zone of the frame 353 is one OFDM symbol shorter than the downlink access zone of the first kind frame 351. Since the subframe 353e that is allocated with the reference signal 353i belongs to the downlink relay zone, the reference signal 353i can be read by an MS (such as the MS 237) or an RS that is in the coverage of the BS 231. The reason that an RS can read the reference signal 353i will be described later.

Third, the processing unit 231b records a piece of information in the BS superframe 35, wherein the piece of information is related to a location of the reference signal in each frame 351, 353. For example, the location may be a number indicating which subframe in the frame being allocated with the reference signal. The location may be recorded in the superframe header 350 of the BS superframe 35. Alternatively, the location may be recorded in a preamble of each of the frames 351, 353. Thereafter, each of the antennas 231c, 231d, 231e, 231f transmits the corresponding BS superframe by the corresponding predetermined subcarriers.

The RS superframe 37 generated by the RS 235 is described. Each of the antennas 235c, 235d, 235e, 235f receives a signal from the computing apparatus 230 through the BS 231, wherein the BS 231 serves the RS 235 and the signal indicates that each of the antennas 235c, 235d, 235e, 235f are able to use a plurality of predetermined subcarriers of the multi-BS and multi-RS wireless communication system 23. Each of the antennas 235c, 235d, 235e, 235f corresponds to a reference signal for channel estimation.

For each of the antennas 235c, 235d, 235e, 235f, the processing unit 231b performs the following operations. First, for each of the antennas 235c, 235d, 235e, 235f, the processing unit 231b generates an RS superframes 37 conforming to the superframe structure 31, wherein the RS superframe 37 comprises a superframe header 370 and a plurality of frames 371, 373. Each of the frames 371 defines a downlink access zone and a downlink relay zone and comprises a plurality of subframes 371a, 371b, 371c, 371d, 371e, 371f, 371g, 371h. The downlink access zone of each of the frames 371 comprises the subframes 371a, 371b, 371c, 371d, while the downlink relay zone of each of the frames 371e, 371f, 371g, 371h comprises the subframes 371e, 371f, 371g, 371h. Similarly, the frame 373 defines a downlink access zone and a downlink relay zone and comprises a plurality of subframes 373a, 373b, 373c, 373d, 373e, 373f, 373g, 373h. The downlink access zone of the frame 373 comprises the subframes 373a, 373b, 373c, 373d, while the downlink relay zone of the frame 373 comprises the subframes 373e, 373f, 373g, 373h.

Second, for each of the antennas 235c, 235d, 235e, 235f, the processing unit 231b allocates the reference signal 371i of the antenna in an OFDM symbol in only one of the subframes (i.e. the subframe 371d) in downlink access zone of the frame 371. It is noted that the processing unit 231b will not allocates reference signal in any subframe of the frame 373. Third, for each of the antennas 235c, 235d, 235e, 235f, the processing unit 231b records a piece of information in the RS superframe 37, wherein the piece of information is related to a location of the reference signal in the frame 371. Thereafter, each of the antennas 235c, 235d, 235e, 235f transmits the corresponding RS superframe by the corresponding predetermined subcarriers.

In the multi-BS and multi-RS wireless communication system 23, the BS superframe 35 and the RS superframe 37 are synchronized. It is emphasized that the downlink access zones of the frames 353, 373 are one OFDM symbol shorter than the downlink access zones of the frame 351, 371. By doing so, after the RS 235 transmits data in the downlink access zone in the frame 373, the RS 235 is able to switch to the reading mode and read the reference signal 353i in the subframe 353e in the downlink relay zone.

In addition, the RS 235 may receive the BS superframes 35 from the antennas 231c, 231d, 231e, 231f and retrieves the reference signals in the BS superframe 35. For each of the antennas 231c, 231d, 231e, 231f, the processing unit 235a of the RS 235 estimates a channel variation. For each of the antennas 231c, 231d, 231e, 231f, the antenna transmits an adjusting signal to the BS 231 if the channel variation is greater than a predetermined level. The adjusting signal is used to inform the BS 231 to increase the occurrence frequency of the reference signal for RS, such as increasing the number of frame 353 from one to two in the BS superframe 35. When there are two frames 353 in one BS superframe 35, the RS 235 can read two reference signals in a cycle of the BS superframe 35. If the channel variation is smaller than another predetermined level. The adjusting signal is used to inform the BS 231 to reduce the occurrence frequency of the reference signal for RS, such as allocating frame 353 for every two or four BS superframe 35.

In the second embodiment, a BS allocates a reference signal in only one subframe of a frame and an RS allocates a reference signal in zero or one subframe of a frame. In addition, in one of the frames of the superframe, the downlink access zone is one OFDM symbol shorter than other frames so that the RS can read the reference signal allocated within the subframe in the downlink relay zone in a frame of the BS superframe. Consequently, the superframe structure 31 can be adapted to the scenario of the multi-BS and multi-RS wireless communication system. Meantime, the radio resources of the wireless communication system can be saved.

Figure 4A:
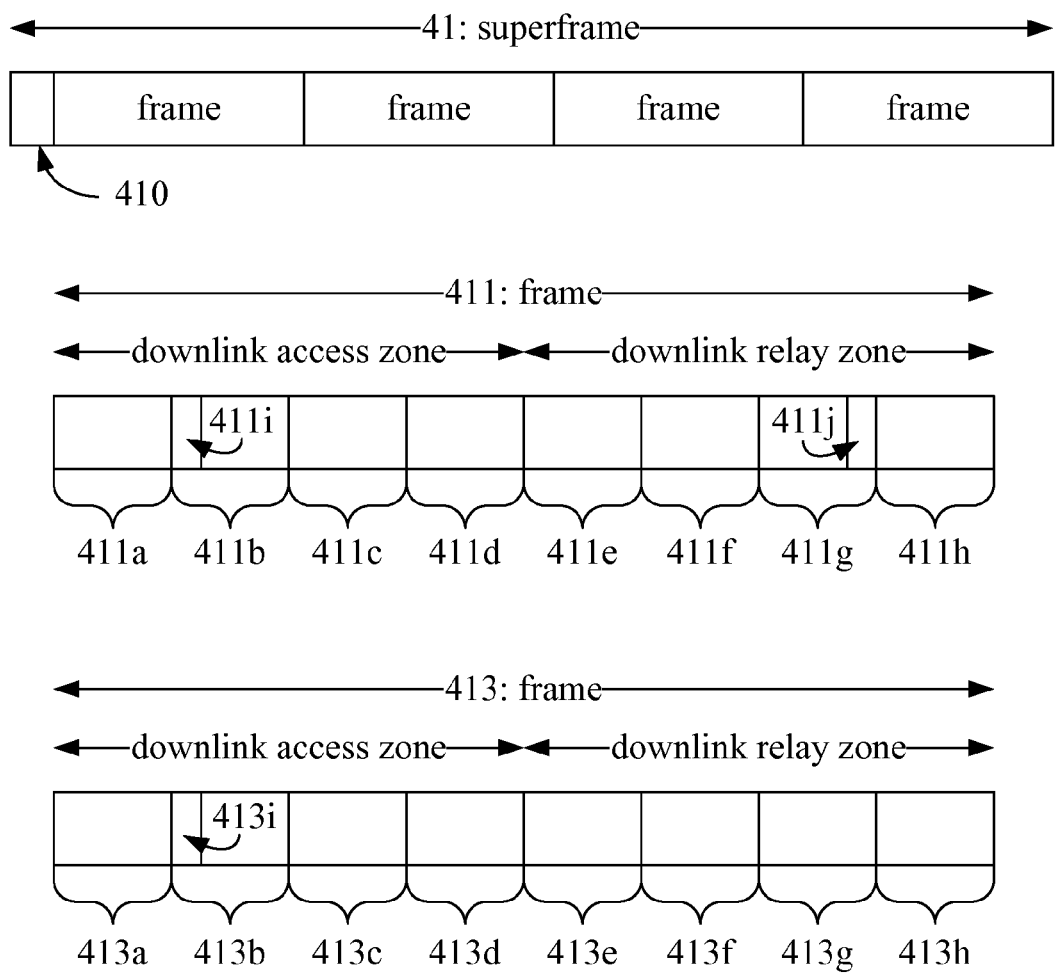
FIG. 4A illustrates a superframe structure used in the third and sixth example embodiments.

FIG. 4A illustrates a superframe structure 41 of the present invention, which will be used in the third to sixth embodiments of the present invention. The superframe structure 41 may conforms to the IEEE 802.16m or the LTE standard. The superframe 41 comprises a superframe header 410 and a plurality of frames. When a BS generates a BS superframe conforming to the superframe structure 41, the BS superframe is a downlink superframe. A frame 411 comprised in the BS superframe is a BS downlink frame defining a downlink access zone and a downlink relay zone. The frame 411 comprises a plurality of subframes, such as eight subframes 411a, 411b, 411c, 411d, 411e, 411f, 411g, 411h. Specifically, the downlink access zone comprises subframes 411a, 411b, 411c, 411d, while the downlink relay zone comprise subframes 411e, 411f, 411g, 411h. The second subframe 411b in the downlink access zone can be allocated a reference signal 411i so that an MS and in the coverage of the BS can read the midamble 411i to estimate the channel status. The third subframe 411h in the downlink relay zone can be allocated a reference signal 411j so that an MS and an RS in the coverage of the BS can read the midamble 411j to estimate the channel status.

When an RS generates an RS superframe conforming to the superframe structure 41, the RS superframe is a downlink superframe. A frame 413 comprised in the superframe 41 is the RS superframe defining a downlink access zone and a downlink relay zone. The frame 413 comprises eight subframes 413a, 413b, 413c, 413d, 413e, 413f, 413g, 413h. Specifically, the downlink access zone comprises subframes 413a, 413b, 413c, 413d, while the downlink relay zone comprise subframes 413e, 413f, 413g, 413h. The second subframe 413b in the downlink access zone can be allocated with a reference signal 413i so that an MS in the coverage of the RS can read the reference signal 413i to estimate the channel status.

Figure 4B:
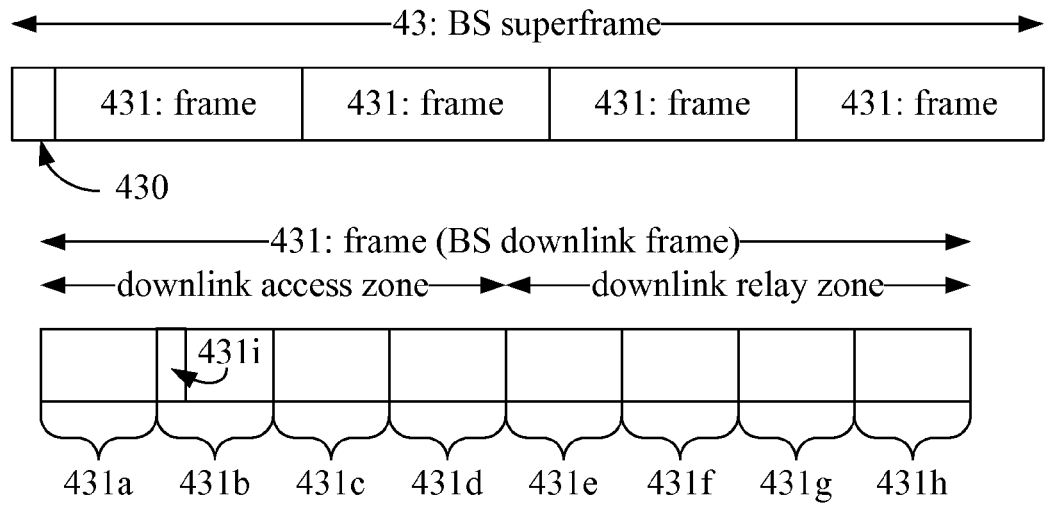
FIGS. 4B and 4C illustrate the BS superframes in the third example embodiment.
Figure 4C:
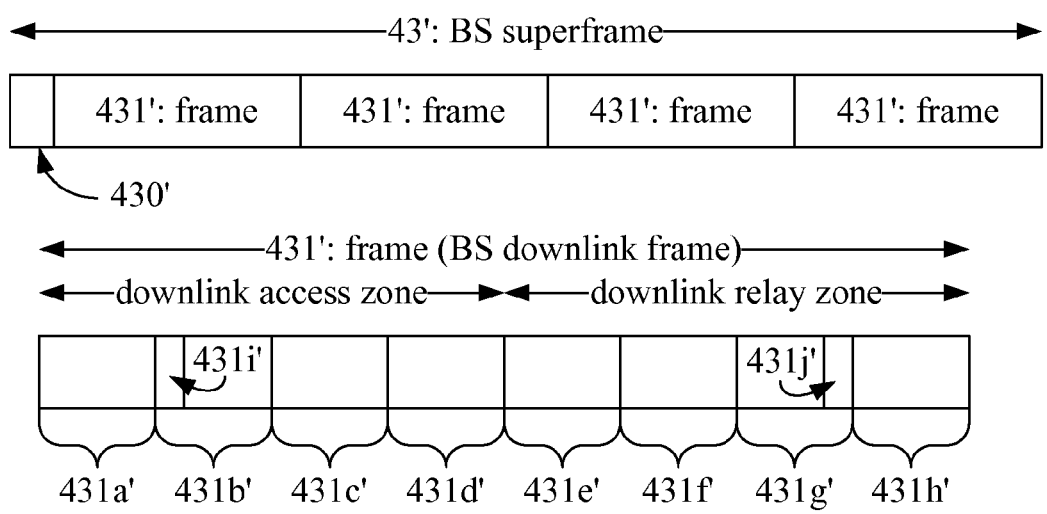

A third embodiment of the present invention is the multi-BS wireless communication system 21 adopting the superframe structure 41. FIG. 4B illustrates a BS superframe 43 generated by the BS 211 in the multi-BS wireless communication system 21. The backhaul interface 211a, the processing unit 211b, and the antennas 211c, 211d, 211e, 211f perform the same operations as those described in the first embodiment. The only difference is the location of the subframe in a frame that the reference signal can be allocated, so the following descriptions focus on this part.

The BS superframe 43 comprises a superframe header 430 and a plurality of frames 431. Each of the frames 431 is a BS downlink frame defining a downlink access zone and a downlink relay zone. Each of the frames 431 comprises a plurality of subframes 431a, 431b, 431c, 431d, 431e, 431f, 431g, 431h. The downlink access zone comprises the subframes 431a, 431b, 431c, 431d, while the downlink relay zone comprises the subframes 431e, 431f, 431g, 431h. The processing unit 211b allocates the reference signal 431i of the antenna in the second kind frame of the downlink access zone so that an MS (such as the MS 217) in the coverage of the BS 211 can read the reference signal. Similarly, since a BS allocates a reference signal in only one subframe in a frame, so the radio resources of the wireless communication system can be saved.

The MS 217 receives the BS superframes 43 from the antennas 211c, 211d, 211e, 211f and retrieves the reference signals in the RS superframe. The MS 217 performs channel estimation for each of the antennas 211c, 211d, 211e, 211f according to the corresponding reference signal. Based on the result of channel estimation, the MS 217 determines that the antenna 211c is an interfered antenna. The MS 217 transmits an adjusting signal regarding to the channel estimation of the antenna 211c to the BS 211. The antenna 211c receives the adjusting signal from the MS 217. The adjusting signal is greater than a predetermined level, which means that the channel status between the BS 211 and the MS 217 is interfered by other BS and/or RS or due to fast channel variation. Thus, the BS 211 adjusts the appearance frequency of the reference signals. Since two subframes 431i', 4311 in the frame 431' can be allocated with a reference signal, the superframe structure 43' can accommodate reference signals from more BSs or more tolerant to channel variation with repeated reference signal transmission.

To be more specific, the processing unit 211b generates the BS superframe 43'conforming to the superframe structure 41 according to the adjusting signal. The BS superframe 43' comprises a plurality of frames 431'. Each of the frames 431' defines a downlink access zone and a downlink relay zone and comprises a plurality of subframes 431a', 431b', 431c', 431d', 431e', 431f', 431g', 431h'. The downlink access zone comprises the subframes 431a', 431b', 431c', 431d', while the downlink relay zone comprises the 431e', 431f', 431g', 431h'.

The processing unit 211b allocates the reference signal 431i', 431j' of the interfered antenna (i.e. the antenna 211c) in two of the subframes (e.g. subframes 431b' and 431g') in each frame. The processing unit 211b further records a piece of information in the BS superframe 43', wherein the piece of information is related to a location of each of the reference signals in each frame. Thereafter, the interfered antenna (i.e. the antenna 211c) transmits the BS superframe 43' by the corresponding predetermined subcarriers.

In this embodiment, it is the MS 217 that determines that the antenna 211c is an interfered antenna; however, in other embodiment, it may be the BS 211 that determines which antenna is an interfered one. For those embodiments, the adjusting signal transmitted by the MS 217 may be a result of the channel estimation so that the BS 211 can use the adjusting signal to do the determination.

Figure 4D:
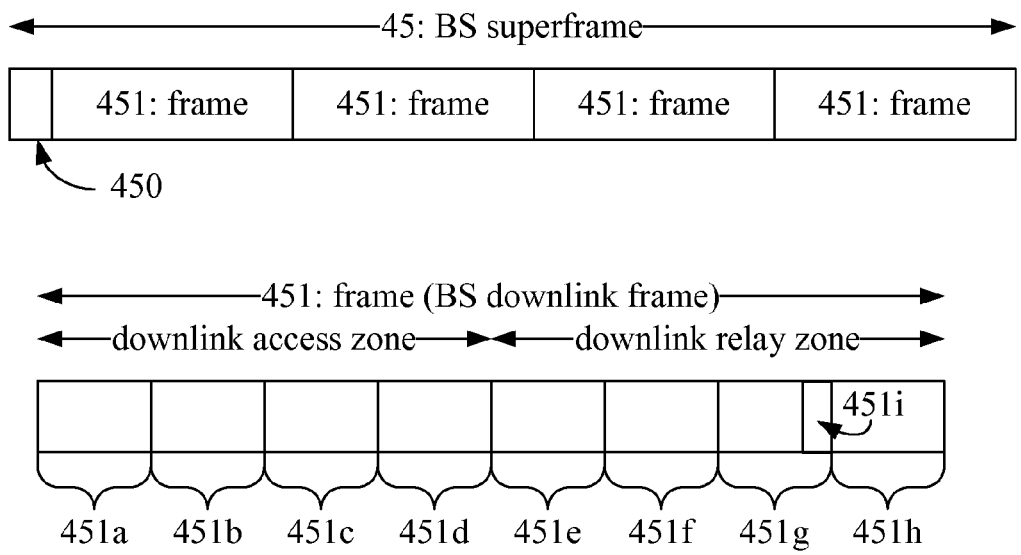
FIG. 4D illustrates a BS superframe in the fourth example embodiment.

A fourth embodiment of the present invention is the multi-BS wireless communication system 21 adopting the superframe structure 41. FIG. 4D illustrates a BS superframe 45 generated by the BS 211 in the multi-BS wireless communication system 21. The only difference between the fourth embodiment and the third embodiment is the location of the subframe in a frame that the reference signal can be allocated, so the following descriptions focus on this part.

The BS superframe 45 comprises a superframe header 450 and a plurality of frames 451. Each of the frames 451 is a BS downlink frame defining a downlink access zone and a downlink relay zone. Each of the frames 451 comprises a plurality of subframes 451a, 451b, 451c, 451d, 451e, 451f, 451g, 451h. The downlink access zone comprise the subframes 451a, 451b, 451c, 451d, while the downlink relay zone comprises the subframes 451e, 451f, 451g, 451h. The processing unit 211b allocates the reference signal 451i of the antenna in the third frame of the downlink relay zone so that an MS in the coverage of the BS 211 can read the reference signal. Similarly, if an antenna is an interfered antenna, the processing unit 211b can adjust the appearance frequency of the reference signals in a frame like the third embodiment. Likewise, since a BS allocates a reference signal in only one subframe in a frame, so the radio resources of the wireless communication system can be saved.

Figure 4E:
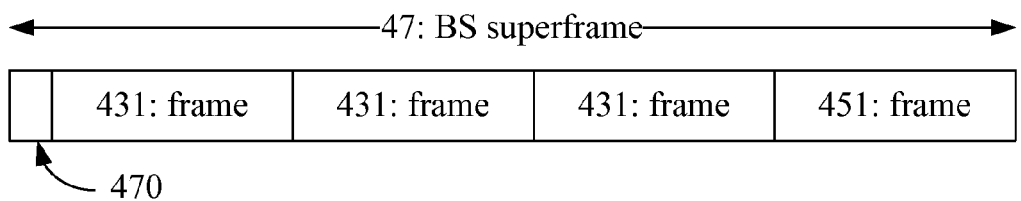
FIG. 4E illustrates a BS superframe in the fifth example embodiment.

A fifth embodiment of the present invention is the multi-BS wireless communication system 21 adopting the superframe structure 41. FIG. 4E illustrates a BS superframe 47 generated by the BS 211 in the multi-BS wireless communication system 21. The only difference between the fifth embodiment and the third embodiment is the location of the subframe in a frame that the reference signal can be allocated, so the following descriptions focus on this part.

The BS superframe 47 comprises a superframe header 470 and a plurality of frames 431, 451, which means the reference signals are allocated with in the BS superframe 47 in the toggle fashion. Likewise, if an antenna is an interfered antenna, the processing unit 211b can adjust the appearance frequency of the reference signals in a frame like the third embodiment. Similarly, since a BS allocates a reference signal in only one subframe in a frame, so the radio resources of the wireless communication system can be saved.

A sixth embodiment of the present invention is the multi-BS and multi-RS wireless communication system 23 adopting the superframe structure 41. The BS superframe generated by the processing unit 231b for each of the antennas 231c, 231d, 231e, 231f is like the BS superframe 47 drawn in FIG. 4E, which is redrawn in FIG. 4E.

Figure 4F:
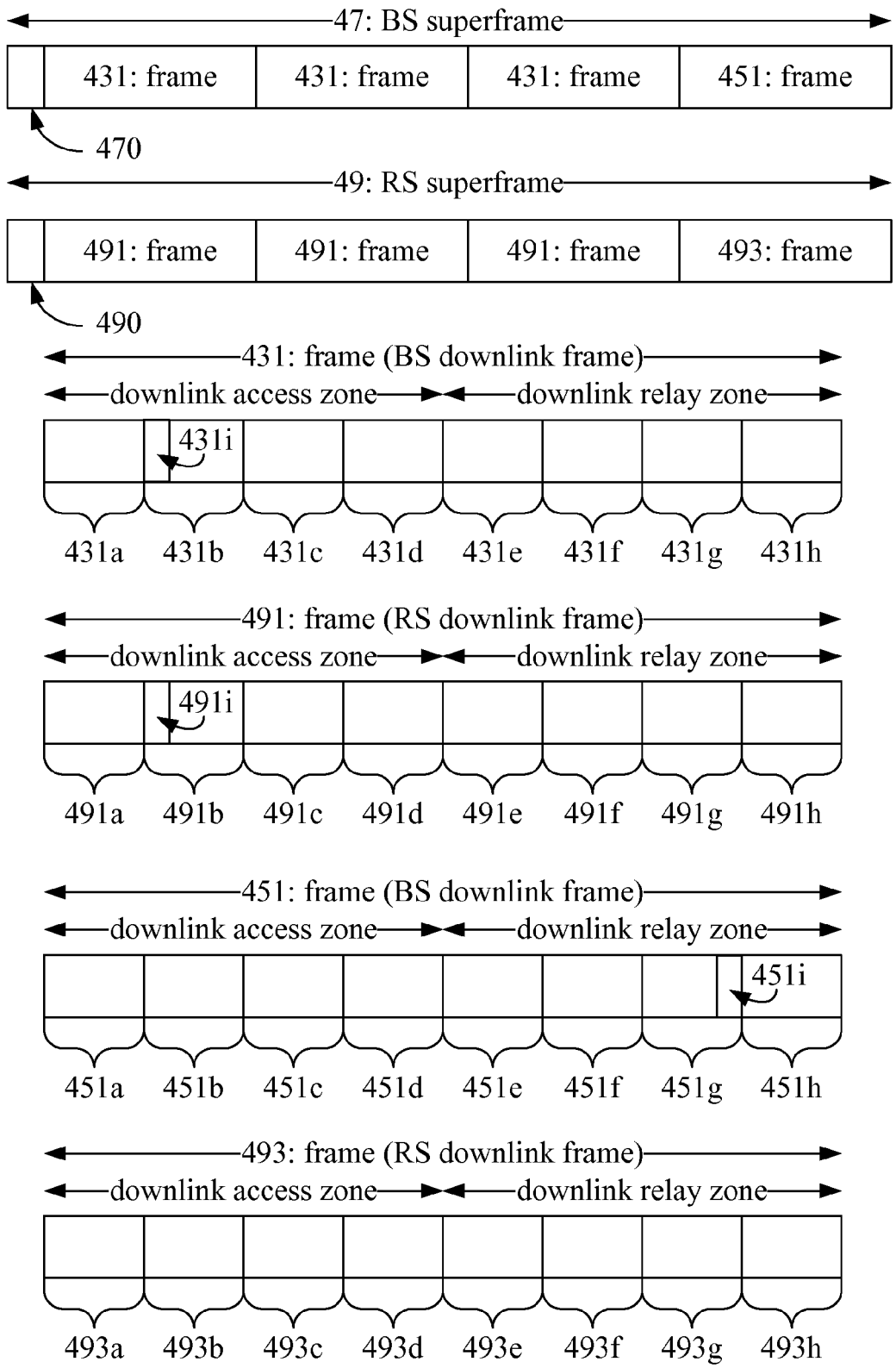
FIG. 4F illustrates an RS superframe in the sixth example embodiment.

The RS superframe generated by the processing unit 235b for each of the antennas 235c, 235d, 235e, 235f are drawn in FIG. 4F. The processing unit 235b and the antennas 235c, 235d, 235e, 235f functions as those described in the second embodiment. The only difference is the location in the frame that the reference signal can be allocated, so the following descriptions focus on this part.

In this embodiment, the RS superframe generated by the processing unit 211b for each of the antennas 235c, 235d, 235e, 235f may be like the RS superframes 49 drawn in FIG. 4F which conform to the superframe structure 41. The RS superframe 49 comprises a superframe header 490 and a plurality of frames 491, 493. Each of the frames 491 is an RS downlink frame defining a downlink access zone and a downlink relay zone. Each of the frames 491 comprises a plurality of subframes 491a, 491b, 491c, 491d, 491e, 491f, 491g, 491h. The downlink access zone of each of the frames 491 comprises the subframes 491a, 491b, 491c, 491d, while the downlink relay zone of each of the frames 491 comprises the subframes 491e, 491f, 491g, 491h. The frames 493 is an RS downlink frame defining a downlink access zone and a downlink relay zone and comprises a plurality of subframes 493a, 493b, 493c, 493d, 493e, 493f, 493g, 493h. The downlink access zone of the frame 493 comprises the subframes 493a, 493b, 493c, 493d, while the downlink relay zone of the frame 493 comprises the subframes 493e, 493f, 493g, 493h. The processing unit 235b allocates the reference signal 491i of the antenna in the second kind frame 491b of the downlink access zone so that an MS in the coverage of the RS 235 can read the reference signal 491i. The subframe 493 has no subframe being allocated with the reference signal.

In sixth second embodiment, a BS allocates a reference signal in only one subframe of a frame. Since the reference signal 451i allocated in the subframe 451g is in the downlink relay zone of the BS superframe, it can be read by the RS 235 and an MS in the coverage of the BS 231. Consequently, the superframe structure drawn in FIG. 4A can be used in the multi-BS and multi-RS wireless communication system 23. Meantime, the radio resources of the wireless communication system can be saved.

Similar to the second embodiment, the RS 235 may receives the BS superframes 47 from the antennas 231c, 231d, 231e, 231f and retrieves the reference signals in the BS superframe 35. For each of the antennas 231c, 231d, 231e, 231f, the processing unit 235a of the RS 235 estimates a channel variation. For each of the antennas 231c, 231d, 231e, 231f, the antenna transmits an adjusting signal to the BS 231 if the channel variation is greater than a predetermined level. The adjusting signal is used to inform the BS 231 to increase the occurrence frequency of the reference signal for RS, such as increasing the number of frame 451 from one to two in the BS superframe 47. When there are two frames 451 in one BS superframe 47, the RS 235 can read two reference signal in a cycle of the BS superframe 47. If the channel variation is smaller than another predetermined level. The adjusting signal is used to inform the BS 231 to reduce the occurrence frequency of the reference signal for RS, such as allocating frame 451 for every two or four BS superframe 47.

Figure 5:
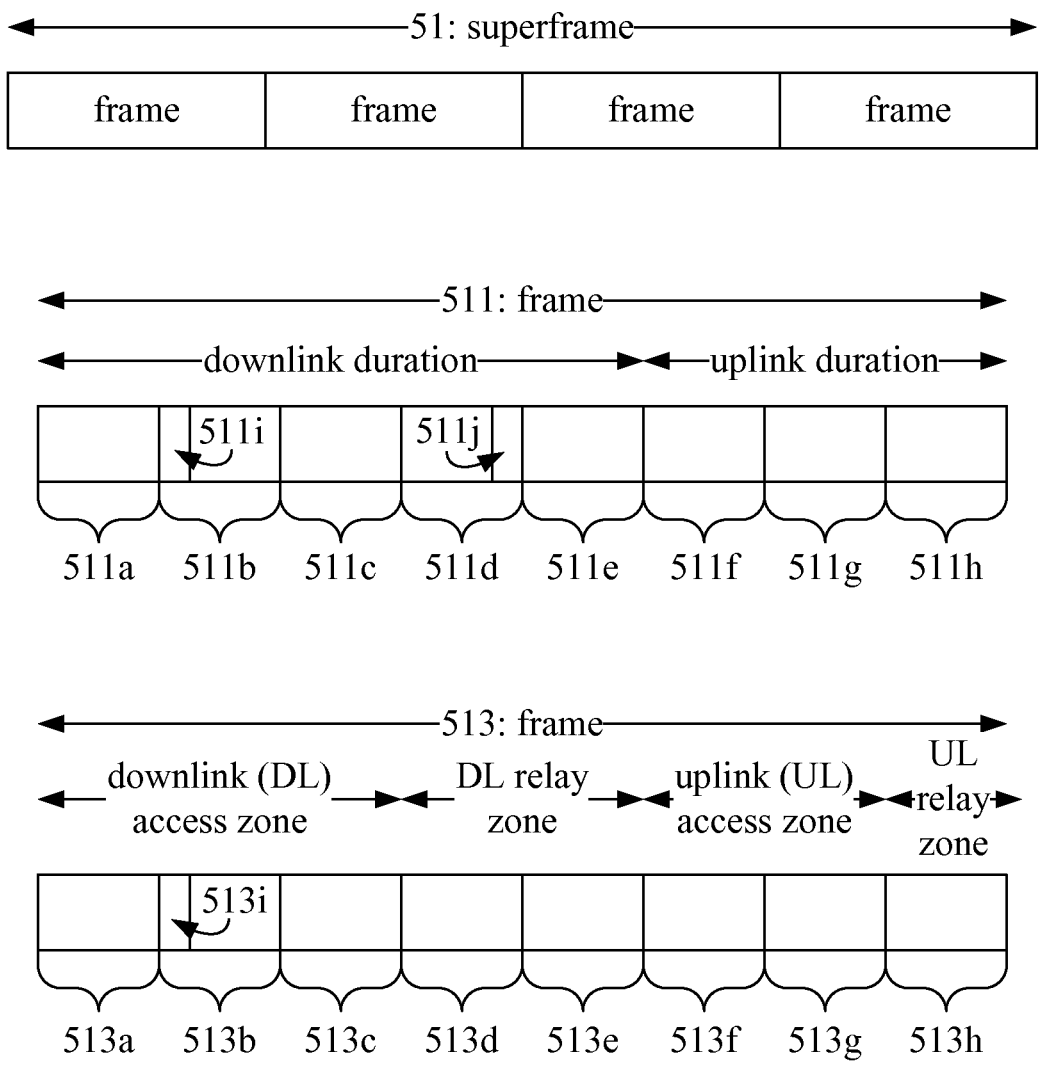
FIG. 5 illustrates a superframe structure that can be used in the example embodiments of the present invention.

FIG. 5 illustrates a superframe structure 51 that can be used in the present invention. The superframe 51 comprises a superframe header 510 and a plurality of frames. When a BS generates a BS superframe conforming to the superframe structure 51, a frame 511 comprised in the BS superframe defines a downlink duration and an uplink duration. The frame 511 comprises five downlink subframes 511a, 511b, 511c, 511d, 511e in the downlink duration and three uplink subframes 511f, 511g, 511h in the uplink duration. The second downlink subframe 511b and the fourth downlink subframe 511d in the downlink duration is respectively used to be allocated reference signals 511i, 511j so that an MS and/or an RS in the coverage of the BS can read the reference signals 511i, 511j to estimate the channel status.

When an RS generate an RS superframe conforming to the superframe structure 51, a frame 513 comprised in the superframe 51 defines a downlink access zone, a downlink relay zone, an uplink access zone, and an uplink relay zone. The frame 513 comprises three downlink subframes 513a, 513b, 513c in the downlink access zone, two downlink subframes 513d, 513e in the downlink relay zone, two uplink subframes 513f, 513g in the uplink access zone, and one uplink subframe 513h in the uplink relay zone. The second downlink subframe 513b in the downlink access zone is used to be allocated a reference signal 513i.

From the descriptions of the above first to sixth embodiments, people skilled in the art is able to know how a multi-BS wireless communication system and a multi-BS and multi-RS wireless communication system generate a BS superframe and an RS superframe conforming to the superframe structure 51, so the details are not repeated.

A seventh embodiment is the computing apparatus 210 used in the multi-BS wireless communication system 21. The computing apparatus 210 comprises the backhaul interface 210a and the processing unit 210b as drawn in FIG. 2C. The backhaul interface 210a is connected to a plurality of base stations, such as the BSs 211, 213, 215. Each of the BSs has a plurality of antennas.

The processing unit 210b determines a number of subcarriers of the wireless communication system and then assigns a usable set of the subcarriers to each of the antennas. The assignment of the subcarriers is elaborated here. In this embodiment, the multi-BS wireless communication system 21 may generate BS superframe like the BS superframes 33, 43, 45, 47. To be more specific, in each frame of these BS superframes 33, 43, 45, 47, only one subframe in a frame is allocated with a reference signal.

Figure 6A:
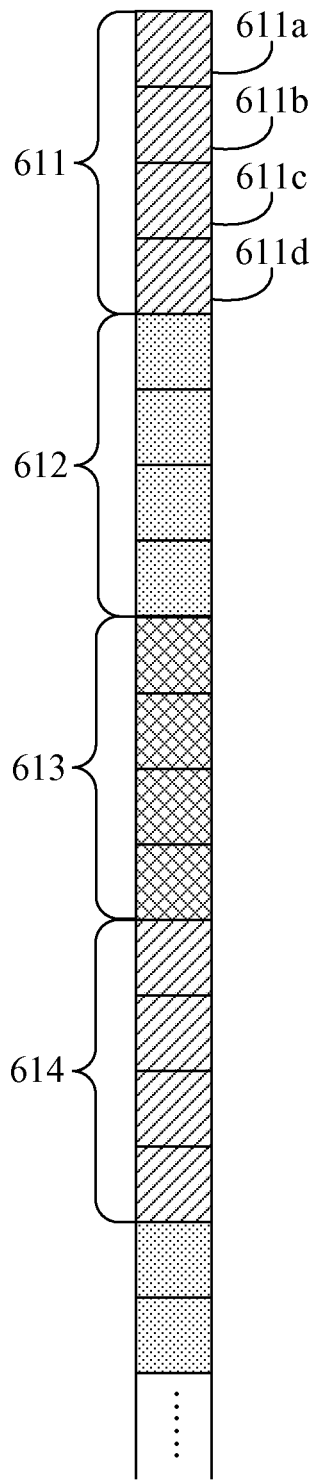

FIG. 6A illustrates the concept of the assignment of the subcarriers to the antennas. Each of the squares corresponds to a subcarrier. Assume that there are twelve subcarrier sets. The computing apparatus 210 will map the antennas into twelve groups. Assume that each of the BSs 211, 213, 215 has four antennas, so each of the antennas can map to the twelve subcarriers sets in a one-on-one fashion.

Then, the processing unit 210b groups the antennas of the same BS in one group. The processing unit 210b then assigns the subcarriers 611 to the antennas of the BS 231. Specifically, the subcarriers 611a, 611b, 611c, 611d are assigned to the first, second, third, and fourth antennas of the BS 231. The processing unit 210b also assigns the subcarriers 612 to the antennas of the BS 232, and assigns the subcarriers 613 to the antennas of the BS 233. The processing unit 210b repeats to assign the subcarriers 614 to the antennas of the BS 231, etc. Thereafter, for each antenna of each of the BSs 231, 232, 233, the backhaul interface 210a transmits a signal indicating the usable set of subcarriers.

If there are six BSs and each of the BSs has four antennas, then the twenty four antennas will be mapped into the twelve subcarrier sets. In that case, there will be two antennas mapped to the subcarrier 611a, two antennas mapped to the subcarrier 611b, two antennas mapped to the subcarrier 611c, two antennas mapped to the subcarrier 611d, etc.

In addition, the number of subcarrier set is adjustable. As mentioned in the previous embodiments, an MS and/or an RS can estimate a frequency selectivity for each of the antennas. The MS and RS can transmit the information of the frequency selectivity to the computing apparatus 21 so that the computing apparatus 21 can determine a suitable number of subcarrier sets. For example, the computing apparatus 21 may decrease the number of subcarrier set when the frequency selectivity is greater than a predetermined level.

In this embodiment, the processing unit 210b assigns different subcarriers to different antennas, so the reference signals of the antennas can be transmitted in a Frequency Division Multiplexing (FDM) fashion.

An eighth embodiment is the computing apparatus 230 used in the multi-BS and multi-RS wireless communication system 23. The computing apparatus 230 comprises the backhaul interface 230a and the processing unit 230b as drawn in FIG. 2C. The backhaul interface 230a is connected to a plurality of BSs. The computing apparatus 230 is connected to a plurality of RSs through BSs with wireless link Each of the BSs has a plurality of antennas and each of the RSs has a plurality of antennas. Assume that there are twelve subcarrier sets. The computing apparatus 230 will map the antennas into twelve groups. Each of the antennas can map to the twelve subcarriers sets in a one-on-one fashion.

The processing unit 210b determines a number of subcarriers of the wireless communication system and then assigns a usable set of the subcarriers to each of the antennas. The assignment of the subcarriers is elaborated here. In this embodiment, the BS superframe and RS superframe are in the form that only one subframe in a frame is allocated with a reference signal. In addition, reference signals in the BS superframe and RS superframe are synchronized.

Figure 6B:
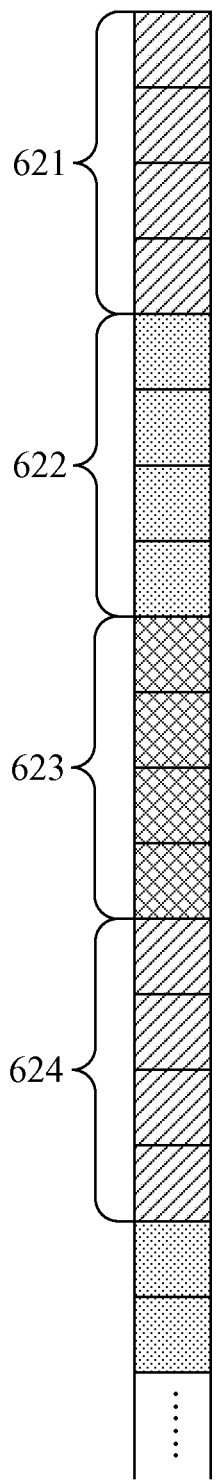

FIG. 6B illustrates the concept of the assignment of the subcarriers to the antennas. Each of the squares corresponds to a subcarrier. Assume that there are two BSs and one RS, and each of the BSs and RS has four antennas. The processing unit 210b assigns the subcarriers 621 to the antennas of the first BS, assigns the subcarriers 622 to the antennas of the RS, and assigns the subcarriers 623 to the antennas of the second BS. The processing unit 210b repeats to assign the subcarriers 624 to the antennas of the first BS 231, etc. Thereafter, for each antenna of each of the BSs and the RS, the backhaul interface 210a transmits a signal indicating the usable set of subcarriers.

Since the processing unit 210b assigns different subcarriers to different antennas, the reference signals of the antennas of the BSs and RS can be transmitted in an FDM fashion.

A ninth embodiment is the computing apparatus 230 used in the multi-BS and multi-RS wireless communication system 23. The computing apparatus 230 comprises the backhaul interface 230a and the processing unit 230b as drawn in FIG. 2C. The backhaul interface 230a is connected to a plurality of base stations. The computing apparatus 230 is connected to a plurality of RSs through BSs with wireless link Each of the BSs has a plurality of antennas and each of the RSs has at least one antenna. Assume that there are twelve subcarrier sets. The computing apparatus 230 will map the antennas into twelve groups. Each of the antennas can map to the twelve subcarriers sets in a one-on-one fashion.

The processing unit 210b determines a number of subcarriers of the wireless communication system and then assigns a usable set of the subcarriers to each of the antennas. The assignment of the subcarriers is elaborated here. In this embodiment, the BS superframe and RS superframe are in the form that only one subframe in s frame is allocated with a reference signal.

Figure 6C:
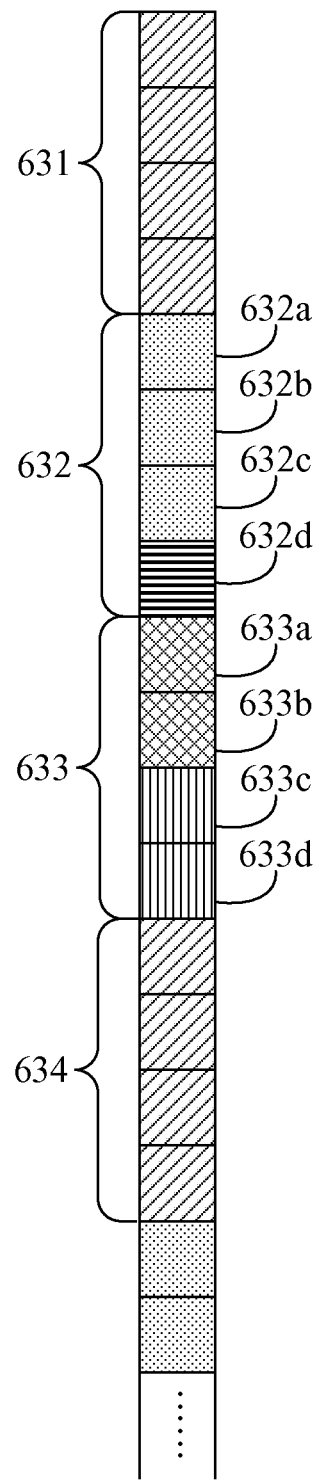

FIG. 6C illustrates the concept of the assignment of the subcarriers to the antennas. Each of the squares corresponds to a subcarrier. Assume that there is one BS and four RSs. The BS has four antennas, the first RS has three antennas, the second RS has one antenna, the third RS has two antennas, and the fourth RS has two antennas. The processing unit 210b treats the antennas of the first and second RSs in the first group and the antennas in the third and fourth RSs in the second group.

The processing unit 210b assigns the subcarriers 631 to the antennas of the BS, assigns the subcarriers 632 to the antennas of the RSs in the first group, assigns the subcarriers 633 to the antennas of the RSs in the second group. Specifically, the subcarriers 632a, 632b, 632c are for the three antennas of the first RS, the subcarriers 632d is for the single antenna of the second RS, the subcarriers 633a, 633b are for the two antennas of the third RS, and the subcarriers 633c, 633d are for the two antennas of the fourth RS. The processing unit 210b repeats to assign the subcarriers 624 to the antennas of the BS 231, etc. Thereafter, for each antenna of each of the BSs and the RS, the backhaul interface 210a transmits a signal indicating the usable set of subcarriers.

Since the processing unit 210b assigns different subcarriers to different antennas, the reference signals of the antennas of the BSs and RS can be transmitted in an FDM fashion.

A tenth embodiment is the computing apparatus 210 used in the multi-BS wireless communication system 21. The computing apparatus 210 comprises the backhaul interface 210a and the processing unit 210b as drawn in FIG. 2C. The backhaul interface 210a is connected to a plurality of base stations, and each of the BSs has a plurality of antennas. Assume that there are twelve subcarrier sets. The computing apparatus 210 will map the antennas into twelve groups. Each of the antennas can map to the twelve subcarriers sets in a one-on-one fashion.

The processing unit 210b determines a number of subcarriers of the wireless communication system and then assigns a usable set of the subcarriers to each of the antennas. The assignment of the subcarriers is elaborated here. In this embodiment, the multi-BS wireless communication system 21 may generate a BS superframe like the BS superframes 43'. To be more specific, in each frame of the BS superframe 43', two subframes in a frame are allocated with a reference signal.

Figure 6D:
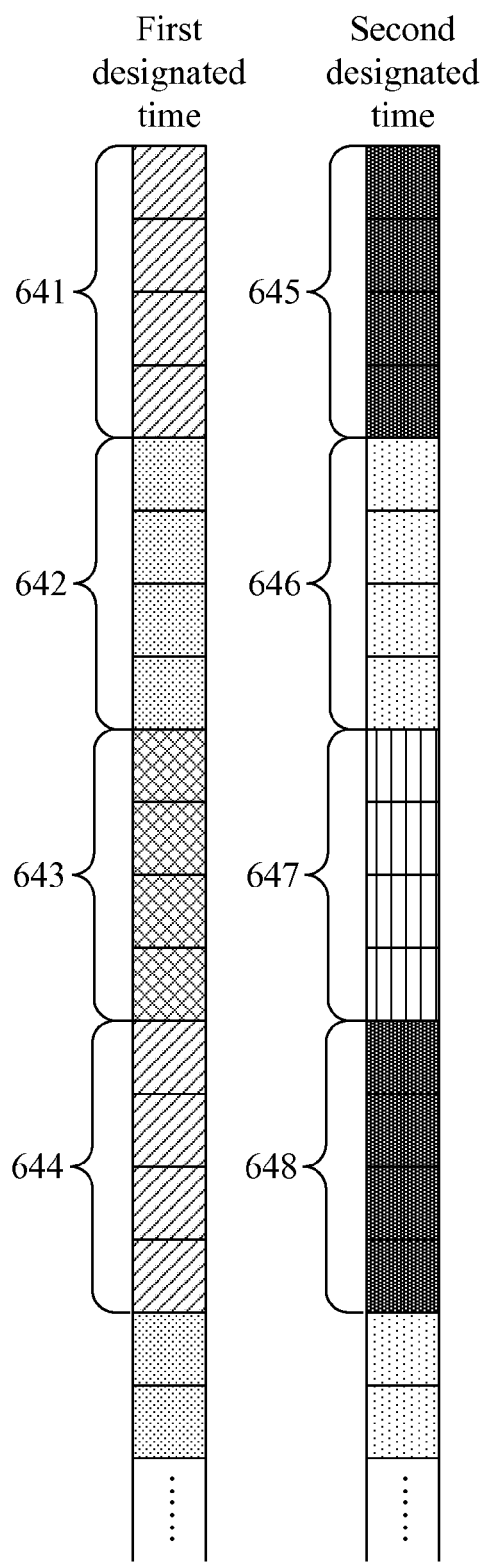

FIG. 6D illustrates the concept of the assignment of the subcarriers to the antennas. Each of the squares corresponds to a subcarrier. Assume that there are six BSs and each of the BSs has four antennas. For the first designated time (i.e. corresponding to first subframe that can be located reference signal), the processing unit 210b assigns the subcarriers 641 to the antennas of the first BS, assigns the subcarriers 642 to the antennas of the second BS, and assigns the subcarriers 643 to the antennas of the third BS, and repeats to assign the subcarriers 644 to the antennas of the first BS.

For the second designated time (i.e. corresponding to second subframe that can be located reference signal), the processing unit 210b assigns the subcarriers 645 to the antennas of the fourth BS, assigns the subcarriers 646 to the antennas of the fifth BS, and assigns the subcarriers 647 to the antennas of the sixth BS, and repeats to assign the subcarriers 648 to the antennas of the fourth BS. Thereafter, for each antenna of each of the BSs, the backhaul interface 210a transmits a signal indicating the usable set of subcarriers and a designated signal representing the first or second designated time.

Since the processing unit 210b assigns different subcarriers to different antennas, the reference signals of the antennas can be transmitted in both an FDM and a Time Division Multiplexing (TDM) fashion.

An eleventh embodiment is the computing apparatus 230 used in the multi-BS and multi-RS wireless communication system 23. The computing apparatus 230 comprises the backhaul interface 230a and the processing unit 230b as drawn in FIG. 2C. The backhaul interface 230a is connected to a plurality of base stations. The computing apparatus 23 is connected to a plurality of RSs through BSs with wireless link Each of the BSs and RSs has a plurality of antennas. Assume that there are twelve subcarrier sets. The computing apparatus 210 will map the antennas into twelve groups. Each of the antennas can map to the twelve subcarriers sets in a one-on-one fashion.

The processing unit 230b determines a number of subcarriers of the wireless communication system and then assigns a usable set of the subcarriers to each of the antennas. The assignment of the subcarriers is elaborated here. In this embodiment, the multi-BS wireless communication system 23 may generate a BS superframe like the BS superframes 45 and a RS superframe is like the RS superframe 49. To be more specific, the BS superframe and the RS superframe use different subframe to allocate reference signals. For example, the BS superframe uses the seventh subframe in a frame to allocate reference signals, while the RS superframe uses the second subframe in a frame to allocate reference signals.

Figure 6E:
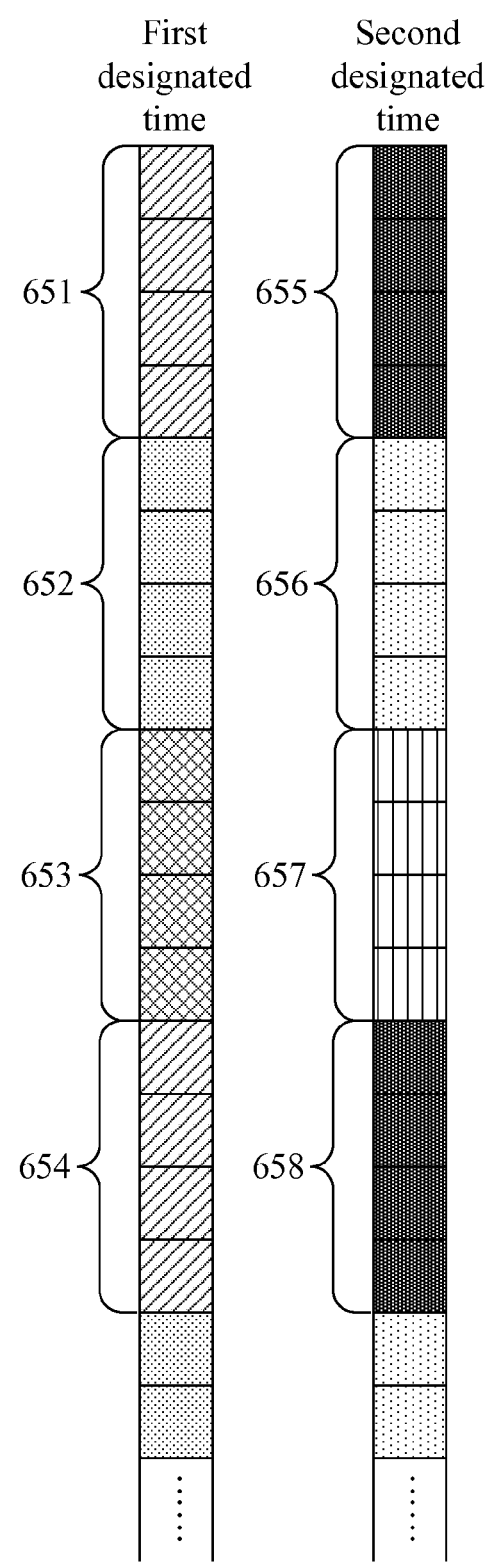

FIG. 6E illustrates the concept of the assignment of the subcarriers to the antennas. Each of the squares corresponds to a subcarrier. Assume that there are three RSs and three BSs, wherein each of the RSs and BSs has four antennas. For the first designated time (i.e. corresponding to first subframe that can be located reference signal), the processing unit 210b assigns the subcarriers 651 to the antennas of the first RS, assigns the subcarriers 652 to the antennas of the second RS, and assigns the subcarriers 653 to the antennas of the third RS, and repeats to assign the subcarriers 654 to the antennas of the first RS.

For the second designated time (i.e. corresponding to second subframe that can be located reference signal), the processing unit 210b assigns the subcarriers 655 to the antennas of the first BS, assigns the subcarriers 656 to the antennas of the second BS, and assigns the subcarriers 657 to the antennas of the third BS, and repeats to assign the subcarriers 658 to the antennas of the first BS. Thereafter, for each antenna of each of the BSs and RSs, the backhaul interface 230a transmits a signal indicating the usable set of subcarriers and a designated signal representing the first or second designated time.

Since the processing unit 230b assigns different subcarriers to different antennas, the reference signals of the antennas can be transmitted in both an FDM and a TDM fashion.

A twelfth embodiment is the computing apparatus 210 used in the multi-BS and multi-RS wireless communication system 23. The computing apparatus 230 comprises the backhaul interface 230a and the processing unit 230b as drawn in FIG. 2C. The backhaul interface 230a is connected to a plurality of base stations. The computing apparatus 230 is connected to a plurality of RSs through BSs with wireless link Each of the BSs and RSs has a plurality of antennas. Assume that there are twelve subcarrier sets. The computing apparatus 210 will map the antennas into twelve groups. Each of the antennas can map to the twelve subcarriers sets in a one-on-one fashion.

The processing unit 230b determines a number of subcarriers of the wireless communication system and then assigns a usable set of the subcarriers to each of the antennas. The assignment of the subcarriers is elaborated here. In this embodiment, the multi-BS wireless communication system 23 may generate a BS superframe like the BS superframes 43' and an RS superframe is like the RS superframe 49. To be more specific, in each frame of the BS superframe 43', two subframes in a frame are allocated with a reference signal.

FIG. 6F illustrates the concept of the assignment of the subcarriers to the antennas. Each of the squares corresponds to a subcarrier. Assume that there are one RS and five BSs, wherein each of the RS and BSs has four antennas. For the first designated time (i.e. corresponding to first subframe that can be located reference signal), the processing unit 210b assigns the subcarriers 661 to the antennas of the first BS, assigns the subcarriers 662 to the antennas of the RS, and assigns the subcarriers 663 to the antennas of the second BS, and repeats to assign the subcarriers 664 to the antennas of the first BS.

For the second designated time (i.e. corresponding to second subframe that can be located reference signal), the processing unit 210b assigns the subcarriers 665 to the antennas of the third BS, assigns the subcarriers 666 to the antennas of the fourth BS, and assigns the subcarriers 667 to the antennas of the fifth BS, and repeats to assign the subcarriers 668 to the antennas of the third BS. Thereafter, for each antenna of each of the BSs and RS, the backhaul interface 230a transmits a signal indicating the usable set of subcarriers and a designated signal representing the first or second designated time.

Since the processing unit 230b assigns different subcarriers to different antennas, the reference signals of the antennas can be transmitted in both an FDM and a TDM fashion.

FIG. 6G illustrates the concept of the assignment of the subcarriers to the antennas used in a thirteenth embodiment. Each of the squares corresponds to a subcarrier. Assume that there are twelve subcarrier set and there are three base stations, wherein each of the base station has four antennas. The processing unit 210b assigns the subcarriers to the antennas in a Code Division Multiplexing (CDM) mode. For example, the processing unit 210b assigns the block 669 to the first antenna of the first BS, assigns the block 670 to the second antenna of the first BS, and assigns the block 671 to the last antenna of the third BS.

People skilled in the art is able to know how to assign the subcarriers to the antennas in a CDM mode, so the details are not described here.

Figure 7:
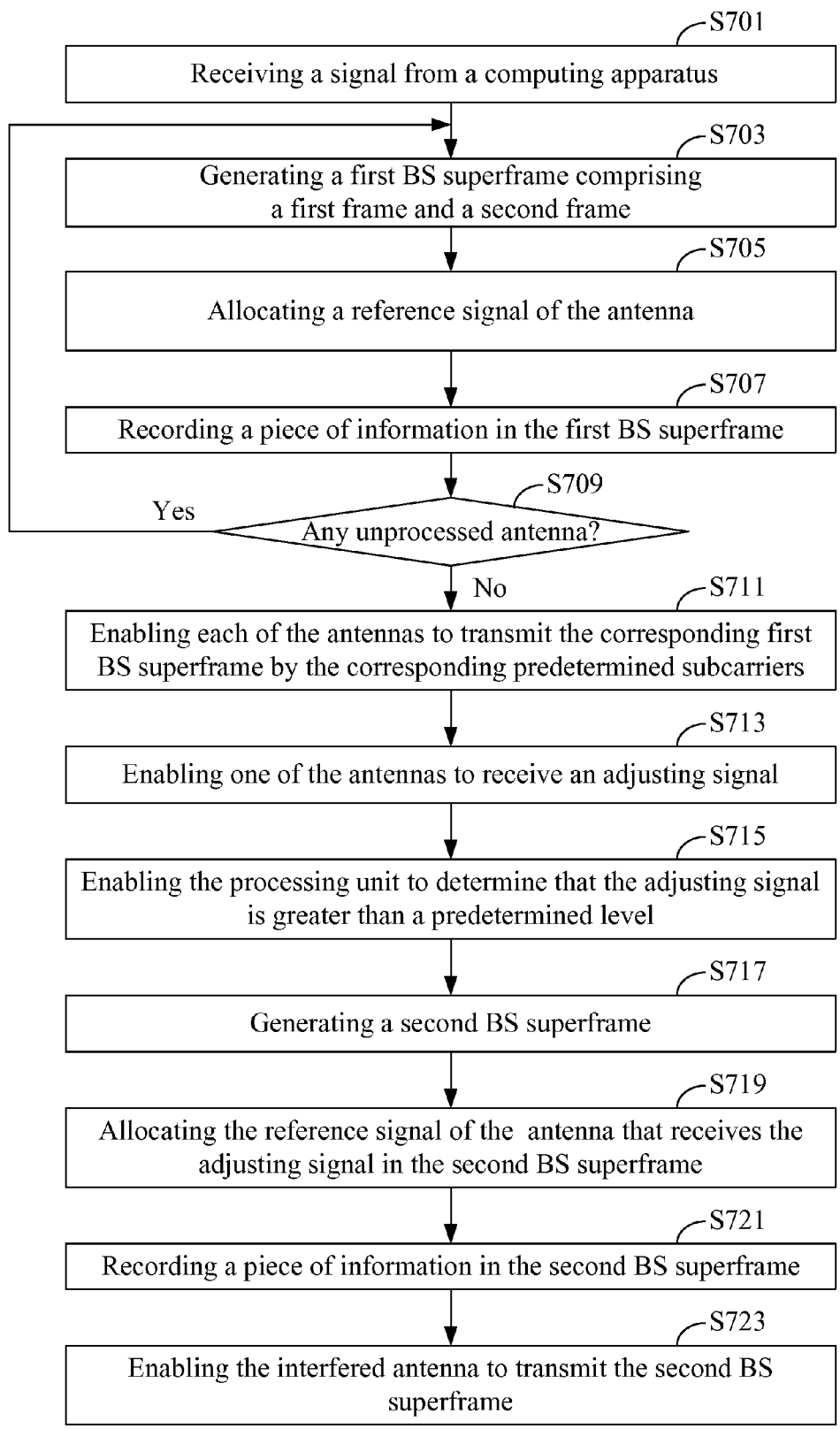
FIGS. 7, 8, 9, 10, 11, and 12 respectively illustrate flowcharts in the fourteenth, fifteenth, sixteenth, seventeenth, eighteenth, and nineteenth example embodiments.

A fourteenth embodiment of the present invention is a reference signal transmission method, whose flowchart is illustrated in FIG. 7. The reference signal transmission method is adapted to be used in a BS, such as the BSs 211, 213, 215, 231, 232, 233 drawn in FIGS. 2A and 2B. The BS comprises a plurality of antennas, a backhaul interface, and a processing unit.

First, step S701 is executed to enabling the backhaul interface to receive a signal from a computing apparatus, wherein the signal indicates that each of the antennas is able to use a plurality of predetermined subcarriers. Next, the reference signal transmission method continues to execute steps S703-S709 for each of the antennas. In step S703, the reference signal transmission method enabling the processing unit to generate a first BS superframe comprising a first kind frame and a second kind frame, wherein each of the first and second kind frames defines a downlink access zone and a downlink relay zone and comprises a plurality of subframes. Then, step S705 is execute to enable the processing unit to allocate a reference signal of the antenna. To be more specific, Step S705 allocates a reference signal of the antenna in a first OFDM symbol in only one of the subframes in the first kind frame and allocates the reference in a second OFDM symbol in only one of the subframes in the second kind frame. The first OFDM symbol belongs to the downlink access zone, and the second OFDM symbol belongs to either the downlink access zone or the downlink relay zone.

In step S707, the reference signal transmission method enables the processing unit to records a piece of information in the first BS superframe, wherein the piece of information being related to a location of the reference signal in each of the first kind frame and second kind frame. Next, step S709 is executed to determine whether an antenna is unprocessed. If it is yes, then the reference signal transmission method goes back to the step S703. If all the antennas have bee processed, the reference signal transmission method proceeds to step S711 to enable each of the antennas to transmit the corresponding first BS superframe by the corresponding predetermined subcarriers.

Next, step S713 is executed to enabling one of the antennas to receive an adjusting signal from one of a mobile station and a relay station. The reference signal transmission method then executes step S715 to enable the processing unit to determine that the adjusting signal is greater than a predetermined level. Following that, step S717 is executed to generate a second BS superframe according to the adjusting signal, wherein the second BS superframe comprises a first and a second kind frames, and each of the first and second kind frames of the second BS superframe comprises a plurality of subframes and defines a downlink access zone and a downlink relay zone. In step S719, the processing unit allocates the reference signal of the antenna that receives the adjusting signal in two of the subframes in each of the first and second kind frames of the second BS superframe. In step S721, the processing unit records a piece of information in the second BS superframe, wherein the piece of information being related to a location of each of the reference signals in each of the first and second kind frames. The reference signal transmission method then executes step S723 to enable the antenna that receives the adjusting signal to transmit the second BS superframe by the corresponding predetermined subcarriers.

Figure 8:
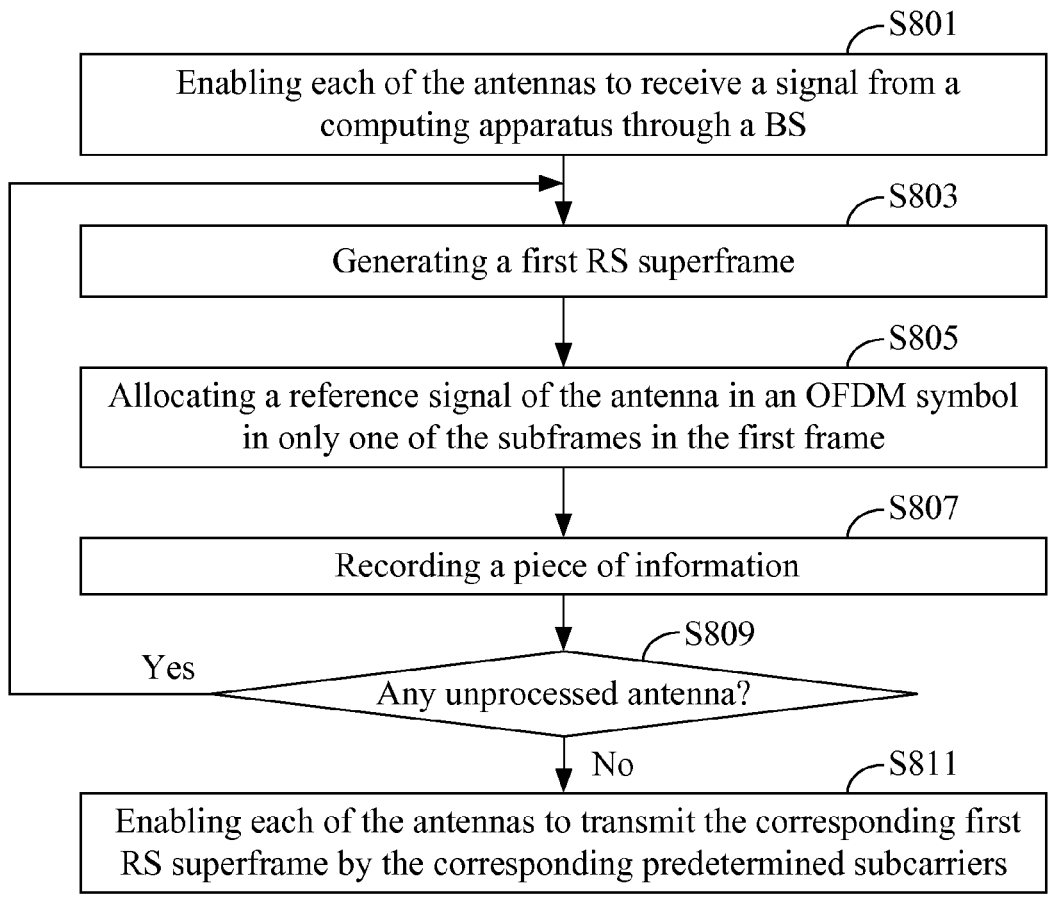

A fifteenth embodiment of the present invention is a reference signal transmission method, whose flowchart is illustrated in FIG. 8. The reference signal transmission method is adapted to be used in an RS, such as the RSs 234, 235, 236 as drawn in FIG. 2B. The RS comprises a plurality of antennas, a backhaul interface, and a processing unit. A wireless communication system comprise a BS, the RS, and a computing apparatus, and the BS serves the RS.

First, step S801 is executed to enable each of the antennas to receive a signal from the computing apparatus through the BS, wherein the signal indicates that each of the antennas being able to use a plurality of predetermined subcarriers. Next, step S803~809 is executed for each of the antennas. In step S803, the reference signal transmission method enables the processing unit to generate a first RS superframe comprising a first kind frame and a second kind frame, and each of the frames comprises a plurality of subframes. Each of the first and second kind frames defines a downlink access zone and a downlink relay zone. Next, step S805 allocates a reference signal of the antenna in an OFDM symbol in only one of the subframes in the first kind frame. The OFDM symbol belongs to the downlink access zone. The reference signal transmission then executes step S807 to record a piece of information for every the predetermined number of the first RS superframe, wherein the piece of information being related to a location of the reference signal in the first kind frame. Next, step S809 is executed to determine whether an antenna is unprocessed. If it is yes, the reference signal transmission method goes back to the step S803. If it is no in step S809, the reference signal transmission method proceeds to step S811 to enable each of the antennas to transmit the corresponding first RS superframe by the corresponding predetermined subcarriers.

Figure 9:
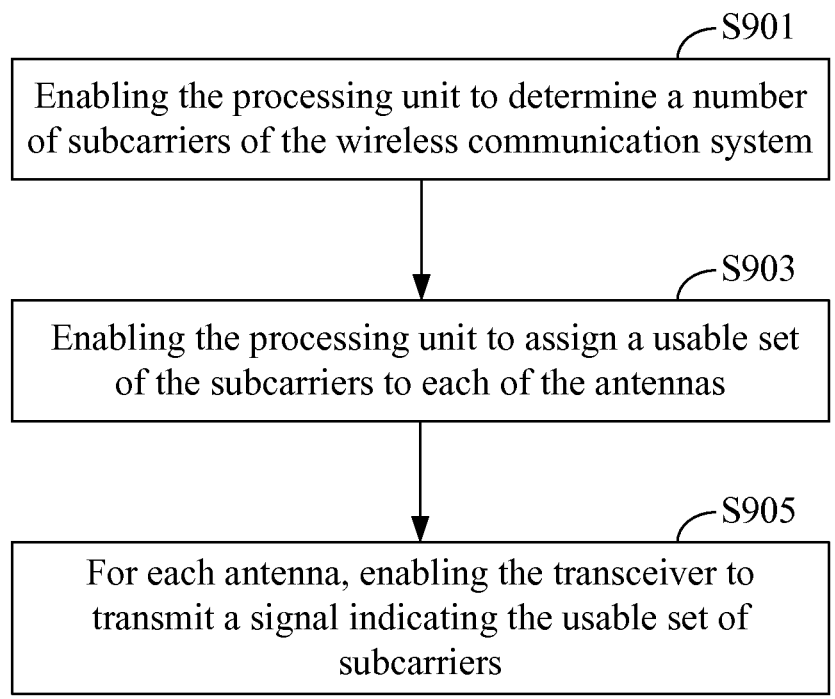

A sixteenth embodiment of the present invention is a reference signal allocation method, which is adapted to be used in a computing apparatus, such as the computing apparatus 210. The computing apparatus comprises a backhaul interface and a processing unit. The backhaul interface is connected to a plurality of BSs, wherein each of the BSs has a plurality of antennas, and a multi-BS wireless communication system comprises the BSs. FIG. 9 illustrates the flowchart of the reference signal allocation method.

The reference signal allocation method executes step S901 to enable the processing unit to determine a number of subcarriers of the wireless communication system. Step S903 is then executed to enable the processing unit to assign a usable set of the subcarriers to each of the antennas. Next, step S905 is executed to enable the backhaul interface to transmit a signal indicating the usable set of subcarriers for each antenna of each of the BSs.

Figure 10:
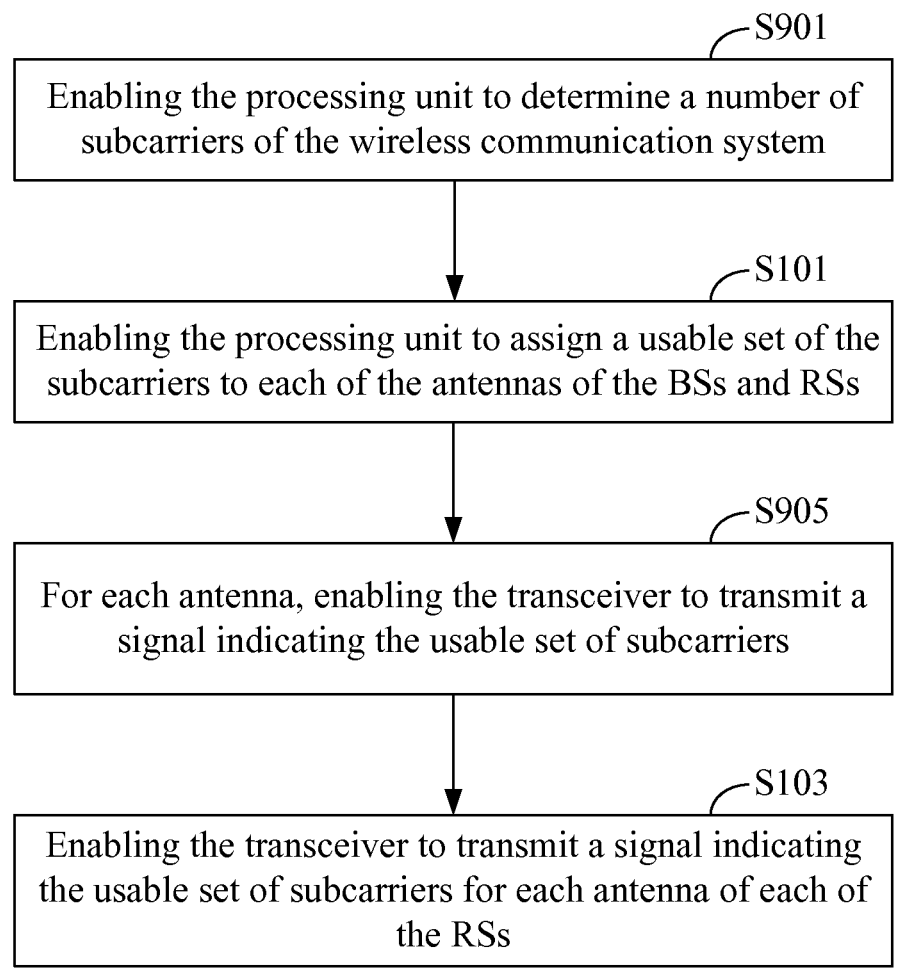

A seventeenth embodiment of the present invention is a reference signal allocation method, which is adapted to be used in a computing apparatus, such as the computing apparatus 230. The computing apparatus comprises a backhaul interface and a processing unit. A wireless communication system comprises a plurality of BSs, a plurality of RSs, and the computing apparatus. The backhaul interface is connected to the BSs. Each of the BSs and RSs has a plurality of antennas, and a multi-BS and multi-RS wireless communication system comprises the BSs. FIG. 10 illustrates the flowchart of the reference signal allocation method.

Like the fifteenth embodiments, the reference signal allocation method of the sixteenth embodiment also executes the step S901. Next, step S101 is then executed to enable the processing unit to assign a usable set of the subcarriers to each of the antennas of the BSs and RSs. Following that, steps S905 and S103 are executed to enable the backhaul interface to transmit a signal indicating the usable set of subcarriers for each antenna of each of the BSs and t a signal indicating the usable set of subcarriers for each antenna of each of the RSs.

Figure 11:
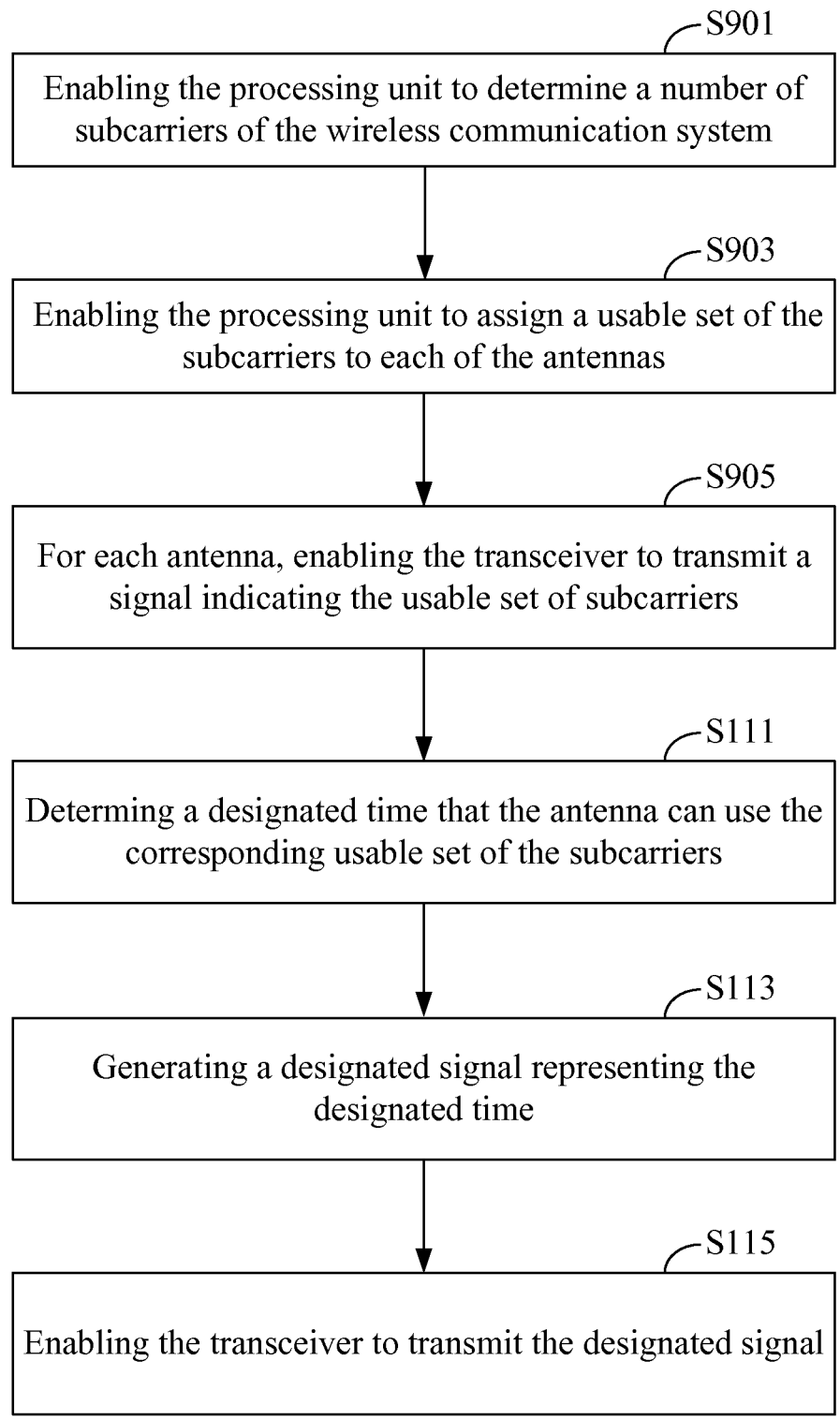

An eighteenth embodiment of the present invention is a reference signal allocation method, which is adapted to be used in a computing apparatus, such as the computing apparatus 210. The computing apparatus comprises a backhaul interface and a processing unit. The backhaul interface is connected to a plurality of BSs, wherein each of the BSs has a plurality of antennas, and a multi-BS wireless communication system comprises the BSs. FIG. 11 illustrates the flowchart of the reference signal allocation method.

The reference signal allocation method also executes steps S901 to S905. Additionally, step S111 is executed to enable the processing unit to determine a designated time that the antenna can use the corresponding usable set of the subcarriers for each antenna of each of the BSs. Then, step S113 is executed to enable the processing unit to generate a designated signal representing the designated time for each antenna of each of the BSs. Next step S115 is executed to enable the backhaul interface to transmit the designated signal.

Figure 12:
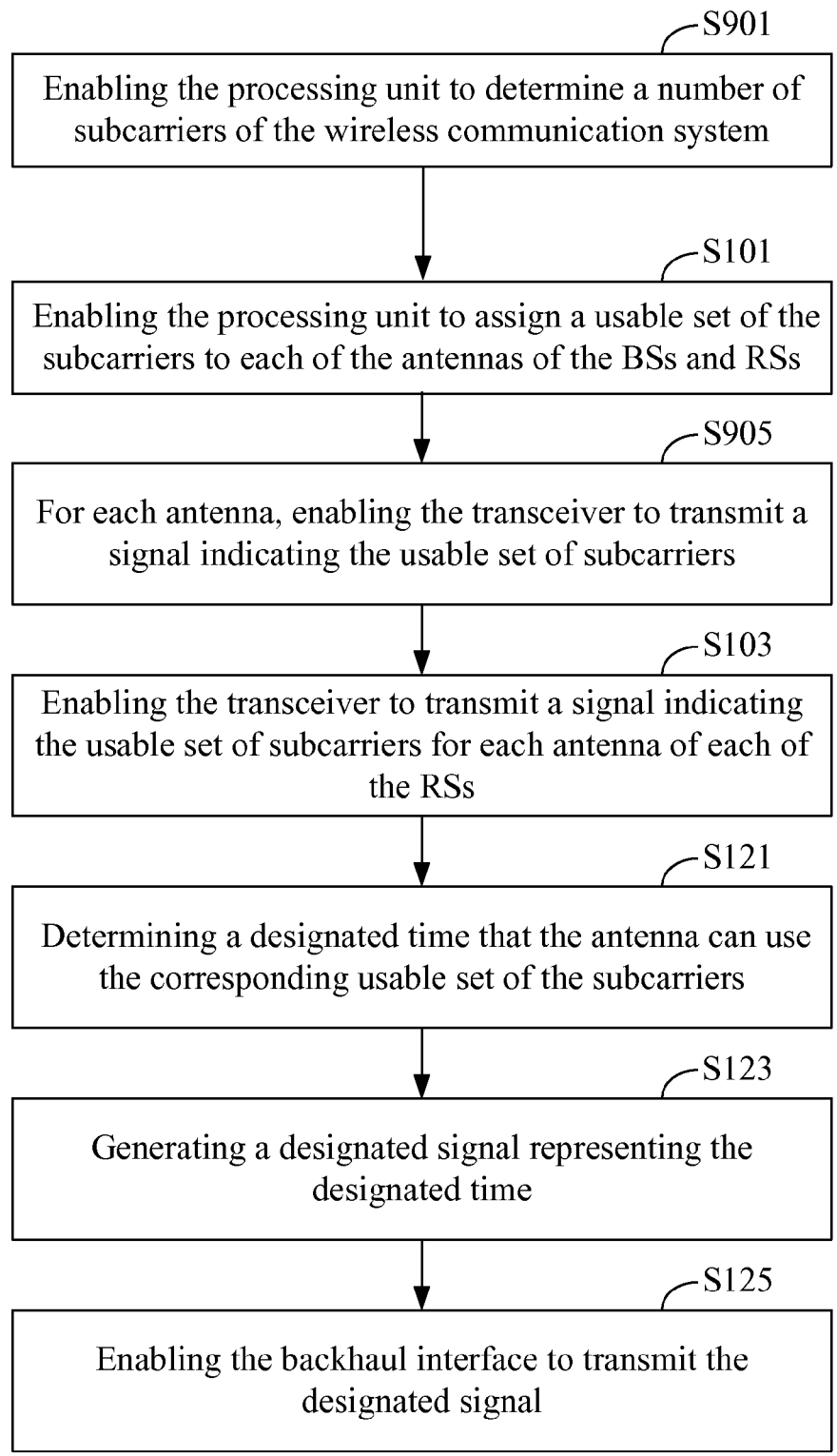

A nineteenth embodiment of the present invention is a reference signal allocation method, which is adapted to be used in a computing apparatus, such as the computing apparatus 230. The computing apparatus comprises a backhaul interface and a processing unit. A wireless communication system comprises a plurality of BSs, a plurality of RSs, and the computing apparatus. The backhaul interface is connected to a plurality of BSs. Each of the BSs and RSs has a plurality of antennas, and a multi-BS and multi-RS wireless communication system comprises the BSs. FIG. 12 illustrates the flowchart of the reference signal allocation method.

Like the seventeenth embodiments, the reference signal allocation method of the sixteenth embodiment also executes steps S901, S101, S905, and S103. Additionally, step S121 is executed to enable the processing unit to determine a designated time that the antenna can use the corresponding usable set of the subcarriers for each antenna of each of the BSs and RSs. Then, step S123 is executed to enable the processing unit to generate a designated signal representing the designated time for each antenna of each of the BSs and RSs. Step S125 is executed to enable the backhaul interface to transmit the designated signal.

Figure 13:
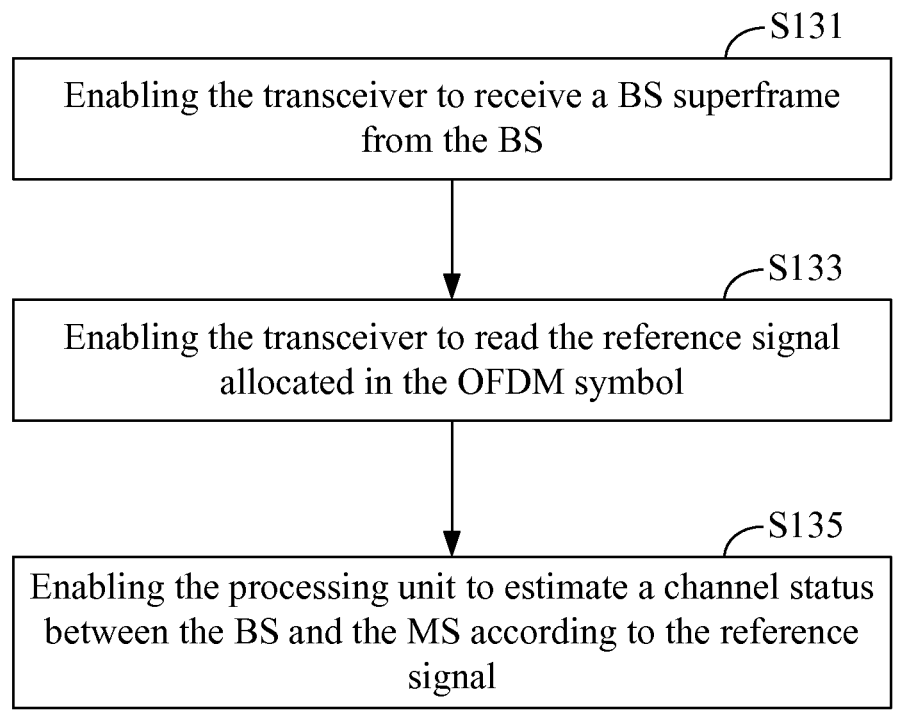
FIGS. 13 and 14 illustrate the flowcharts in the twentieth and twenty first example embodiments, respectively.

A twentieth embodiment of the present invention is a reference signal receiving method, whose flowchart is illustrated in FIG. 13. The reference signal receiving method is adapted to a mobile station (MS). A wireless communication system comprises a BS and the MS. The BS serves the MS. The MS comprises a processing unit and a transceiver.

The reference signal receiving method enables the MS to read a BS superframe that allocates a reference signal in a down link relay zone of a frame, such as the BS superframe 43' (whose frames 431' have subframes 431g' in the downlink relay zone being allocated with reference signals 431j'), BS superframe 45 (whose frames 451 have subframes 451g in the downlink relay zone being allocated with reference signals 451i), etc.

Please refer to the BS superframe 45 in the following descriptions to understand the reference signal receiving method. First, step S131 is executed to enable the transceiver to receive the BS superframe 45 from the BS. The BS superframe 45 comprises four frames 451, and each of the frames 451 comprises the subframes 451a, 451b, 451c, 451d, 451e, 451f, 451g, 451h and defines a downlink access zone and a downlink relay zone. An OFDM symbol in one subframe (i.e. subframe 451g) of each of the frames 451 is allocated with a reference signal, and the OFDM symbol belongs to the downlink relay zone.

Next, step S133 is executed to enable the transceiver to read the reference signal allocated in the OFDM symbol. Afterwards, step S135 is executed to enable the processing unit to estimate a channel status between the BS and the MS according to the reference signal.

According to the above descriptions, it is learned that the MS can read the reference signal in the downlink relay zone by the reference signal receiving method. When a BS superframe also has a reference signal in a downlink access zone, the MS can use both the reference signals in the downlink access zone and downlink relay zone to estimate a channel status.

Figure 14:
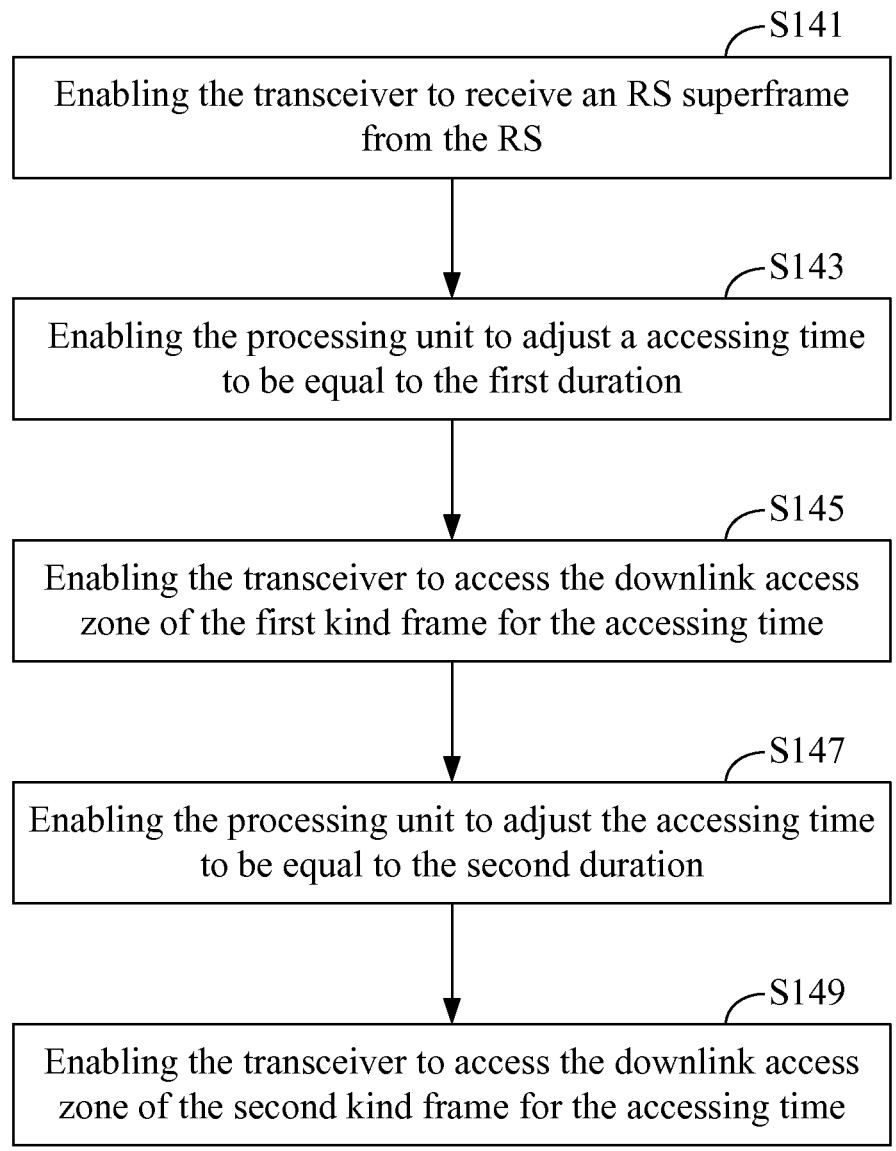

A twenty first embodiment of the present invention is a reference signal receiving method, whose flowchart is illustrated in FIG. 14. The reference signal receiving method is adapted to an MS. A wireless communication system comprises an RS and the MS. The RS serves the MS. The MS comprises a processing unit and a transceiver.

Please refer to FIG. 3C as well. First, step S141 is executed to enabling the transceiver to receive an RS superframe 37 from the RS. The RS superframe 37 comprises a first kind frames 371 and a second kind frame 373. Each of the first kind frames 371 defines a downlink access zone and a downlink relay zone. The second kind frame 373 defines a downlink access zone and a downlink relay zone. A first duration of the downlink access zone of the first kind frame is unequal to a second duration of the downlink access zone of the second kind frame. Step S143 is executed to enable the processing unit to adjust an accessing time to be equal to the first duration. Next, step S145 is executed to enable the transceiver to access the downlink access zone of the first kind frame for the accessing time.

Following that, step S147 is executed to enable the processing unit to adjust the accessing time to be equal to the second duration. Step S149 is executed to enable the transceiver to access the downlink access zone of the second kind frame for the accessing time. Since the duration of the downlink access zone is adjustable, when the MS shorten the duration of the downlink access zone, the RS can switch to a reading mode to access a downlink relay zone in a frame of a BS superframe, the RS can read the reference signals in downlink relay zone to estimate a channel status from BS.

The present invention is related to frame structures, BSs using the frame structures, RSs using the frame structures, reference signal transmission method, and reference signal allocation method that are used in multi-cell wireless communication systems. By having the frame structures along with the reference signal transmission method and reference signal allocation method, reference signals occupies less radio resources than the prior technologies.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A base station (BS), comprising:
   a plurality of antennas;
   a backhaul interface, being configured to receive a signal from a computing apparatus, the signal indicating that each of the antennas is able to use a plurality of predetermined subcarriers; and
   a processing unit, being configured to perform the following operations for each of the antennas:
      generating a first BS superframe comprising a first kind frame and a second kind frame, each of the first and second kind frames comprising a plurality of subframes, each of the first and second kind frames defining a downlink access zone and a downlink relay zone,
      allocating a reference signal of the antenna in a first Orthogonal Frequency-Division Multiplexing (OFDM) symbol in only one of the subframes in the first kind frame, the first OFDM symbol belonging to the downlink access zone of the first kind frame,
      allocating the reference signal in a second OFDM symbol in only one of the subframes in the second kind frame, the second OFDM symbol belonging to one of the downlink access zone and the downlink relay zone, and recording a piece of information in the first BS superframe, the piece of information being related to a location of the reference signal in each of the first and second kind frames, wherein each of the antennas is configured to transmit the corresponding first BS superframe by the corresponding predetermined subcarriers.

2. The base station of claim 1, wherein each of the first BS superframes comprises a superframe header and the processing unit records the piece of information in the corresponding superframe header for each of the antennas.

3. The base station of claim 1, wherein each of the frames comprises a preamble and the processing unit records the piece of information in the preambles of the frames for each of the antennas.

4. The base station of claim 1, wherein one of the antennas is further configured to receive an adjusting signal from one of a mobile station and a relay station, the adjusting signal is greater than a predetermined level, the processing unit is further configured to perform the following operations for the antenna that receives the adjusting signal:

generating a second BS superframe according to the adjusting signal, the second BS superframe comprising a first kind frame and a second kind frame, each of the first and second kind frames of the second BS superframe comprising a plurality of subframes and defining a downlink access zone and a downlink relay zone, allocating the reference signal of the antenna that receives the adjusting signal in two of the subframes in each of the first and second kind frames of the second BS superframe, one of the subframes belonging to the downlink access zone, the other of the subframes belonging to the downlink relay zone, and recording a piece of information in the second BS superframe, the piece of information being related to a location of each of the reference signals in each of the first and second kind frames, and wherein the antenna that receives the adjusting signal is further configured to transmit the second BS superframe by the corresponding predetermined subcarriers.

5. A relay station (RS), a wireless communication system comprising a BS, the RS, and a computing apparatus, the BS serving the RS, the RS comprising:

a plurality of antennas, each of the antennas being configured to receive a signal from a computing apparatus through the BS, the signal indicating that each of the antennas is able to use a plurality of predetermined subcarriers; and a processing unit, being configured to perform the following operations for each of the antennas:

generating a first RS superframe comprising a first and second kind frames, each of the first and second kind frames comprising a plurality of subframes, each of the first and second kind frames defining a downlink access zone and a downlink relay zone, allocating a reference signal of the antenna in an OFDM symbol in only one of the subframes in the first kind frame, the first OFDM symbol belonging to the downlink access zone of the first kind frame, and recording a piece of information in the first RS superframe, the piece of information being related to a location of the reference signal in the first kind frame, wherein each of the antennas is configured to transmit the corresponding first RS superframe by the corresponding predetermined subcarriers.

6. The relay station of claim 5, wherein each of the first RS superframes comprises a superframe header and the processing unit records the piece of information in the superframe header for every the predetermined number of the first RS superframe for each of the antennas.

7. A computing apparatus, comprising:

a backhaul interface, being connected to a plurality of base stations (BSs), each of the BSs having a plurality of antennas, a wireless communication system comprising the BSs and a plurality of RSs, wherein each of the RSs has a plurality of antennas; and a processing unit, being configured to determine a number of subcarriers of the wireless communication system and assign a usable set of the subcarriers to each of the antennas of the BSs and the RSs, wherein the backhaul interface is configured to perform the following operation for each antenna of each of the BSs and the RSs:

transmitting a signal indicating the usable set of subcarriers;

wherein for each antenna of each of the BSs, the processing unit further determines a first designated time that the antenna can use the corresponding usable set of the subcarriers and generates a first designated signal representing the first designated time, and the backhaul interface further transmits the first designated signal.

8. The computing apparatus of claim 7, wherein for each antenna of each of the RSs, the processing unit further determines a second designated time that the antenna can use the corresponding usable set of the subcarriers and generates a second designated signal representing the second designated time, and the backhaul interface is further configured to transmit the second designated signal.

9. A reference signal transmission method, being adapted to a BS, the BS comprising a plurality of antennas, a backhaul interface, and a processing unit, the reference signal transmission method comprising the steps of:

(a) enabling the backhaul interface to receive a signal from a computing apparatus, the signal indicating that each of the antennas is able to use a plurality of predetermined subcarriers;

(b) enabling the processing unit to perform the following operations for each of the antennas:

(b1) generating a first BS superframe comprising a first kind frame and a second kind frame, each of the first and second kind frames comprising a plurality of subframes, each of the first and second kind frames defining a downlink access zone and a downlink relay zone;

(b2) allocating a reference signal of the antenna in a first OFDM symbol in only one of the subframes in the first kind frame, the first OFDM symbol belonging to the downlink access zone;

(b3) allocating the reference signal in a second OFDM symbol in only one of the subframes in the second kind frame, the second OFDM symbol belonging to one of the downlink access zone and the downlink relay zone; and (b4) recording a piece of information in the first BS superframe, the piece of information being related to a location of the reference signal in each of the first and second kind frames; and
(c) enabling each of the antennas to transmit the corresponding first BS superframe by the corresponding predetermined subcarriers.

10. The reference signal transmission method of claim 9, wherein each of the first BS superframes comprises a superframe header and the step (b3) records the piece of information in the corresponding superframe header for each of the antennas.

11. The reference signal transmission method of claim 9, wherein each of the frames comprises a preamble and the step (b3) records the piece of information in the preambles of the frames for each of the antennas.

12. The reference signal transmission method of claim 9, further comprising the steps:
    enabling one of the antennas to receive an adjusting signal from one of a mobile station and a relay station;
    enabling the processing unit to determine that the adjusting signal is greater than a predetermined level;
    enabling the processing unit to perform the following operations for the antenna that receives the adjusting signal:
        generating a second BS superframe according to the adjusting signal, the second BS superframe comprising a first kind frame and a second kind frame, each of the first and second kind frames of the second BS superframe comprising a plurality of subframes and defining a downlink access zone and a downlink relay zone;
        allocating the reference signal of the antenna that receives the adjusting signal in two of the subframes in each of the first and second kind frames of the second BS superframe, one of the subframes belonging to the downlink access zone, the other of the subframes belonging to the downlink relay zone; and
        recording a piece of information in the second BS superframe, the piece of information being related to a location of each of the reference signals in each of the first and second kind frames; and
    enabling the antenna that receives the adjusting signal to transmit the second BS superframe by the corresponding predetermined subcarriers.

13. A reference signal transmission method, being adapted to an RS, a wireless communication system comprising a BS, the RS, and a computing apparatus, the BS serving the RS, the RS comprising a plurality of antennas, and a processing unit, the reference signal transmission method comprising the steps of:
    (a) enabling each of the antennas to receive a signal from a computing apparatus through the BS, the signal indicating that each of the antennas being able to use a plurality of predetermined subcarriers; and
    (b) enabling the processing unit to perform the following operations for each of the antennas:
        (b1) generating a first RS superframe comprising a first kind frame and a second kind frame, each of the first and second kind frames comprising a plurality of subframes, each of the first and second kind frames defining a downlink access zone and a downlink relay zone;
        (b2) allocating a reference signal of the antenna in an OFDM symbol in only one of the subframes in the first kind frame, the OFDM symbol belonging to the downlink access zone of the first kind frame; and
        (b3) recording a piece of information in the first RS superframe, the piece of information being related to a location of the reference signal in the first kind frame; and
    enabling each of the antennas to transmit the corresponding first RS superframe by the corresponding predetermined subcarriers.

14. The reference signal transmission method of claim 13, wherein each of the first RS superframes comprises a superframe header and the step (b3) records the piece of information in the superframe header for every the predetermined number of the first RS superframe for each of the antennas.

15. A reference signal allocation method, being adapted to a computing apparatus, the computing apparatus comprising a backhaul interface and a processing unit, the backhaul interface being connected to a plurality of BSs, each of the BSs having a plurality of antennas, a wireless communication system comprising the BSs and a plurality of relay stations RSs, each of the RSs having a plurality of antennas, the reference signal allocation method comprising the steps of:
    enabling the processing unit to determine a number of subcarriers of the wireless communication system;
    enabling the processing unit to assign a usable set of the subcarriers to each of the antennas of the BSs and the RSs; and
    enabling the backhaul interface to perform the following operation for each antenna of each of the BSs and the RSs:
        transmitting a signal indicating the usable set of subcarriers;
    enabling the processing unit to perform the following operation for each antenna of each of the BSs:
        determining a first designated time that the antenna can use the corresponding usable set of the subcarriers;
        generating a first designated signal representing the first designated time; and
    enabling the backhaul interface to transmit the first designated signal for each antenna of each of the BSs.

16. The reference signal allocation method of claim 15, further comprising the steps of:
    enabling the processing unit to perform the following operation for each antenna of each of the RSs:
        determining a second designated time that the antenna can use the corresponding usable set of the subcarriers; and
        generating a second designated signal representing the second designated time; and
    enabling the backhaul interface to transmit the second designated signal to each antenna of each of the RSs.

17. A reference signal receiving method, being adapted to a mobile station (MS), a wireless communication system comprising a BS and the MS, the BS serving the MS, the MS comprising a processing unit and a transceiver, the reference signal receiving method comprising the steps of:
    (a) enabling the transceiver to receive a BS superframe from the BS, the BS superframe comprising a frame, the frame comprising a plurality of subframes and defining a downlink access zone and a downlink relay zone, an OFDM symbol in one subframe of the frame being allocated with a reference signal, the OFDM symbol belonging to the downlink relay zone;
    (b) enabling the transceiver to read the reference signal allocated in the OFDM symbol; and
    (c) enabling the processing unit to estimate a channel status between the BS and the MS according to the reference signal.

18. A reference signal receiving method, being adapted to an MS, a wireless communication system comprising an RS and the MS, the RS serving the MS, the MS comprising a processing unit and a transceiver, the reference signal receiving method comprising the steps of:
   (a) enabling the transceiver to receive an RS superframe from the RS, the RS superframe comprising a first kind frame and a second kind frame, the first kind frame defining a downlink access zone and a downlink relay zone, the second kind frame defining a downlink access zone and a downlink relay zone, a first duration of the downlink access zone of the first kind frame being unequal to a second duration of the downlink access zone of the second kind frame;
   (b) enabling the processing unit to adjust an accessing time to be equal to the first duration;
   (c) enabling the transceiver to access the downlink access zone of the first kind frame for the accessing time;
   (d) enabling the processing unit to adjust the accessing time to be equal to the second duration; and
   (e) enabling the transceiver to access the downlink access zone of the second kind frame for the accessing time.

* * * * *